(12) United States Patent
Edwards et al.

(10) Patent No.: US 12,341,668 B2
(45) Date of Patent: *Jun. 24, 2025

(54) UTILIZING MACHINE LEARNING WITH SELF-SUPPORT ACTIONS

(71) Applicant: Capital One Services, LLC, McLean, VA (US)

(72) Inventors: Joshua Edwards, Philadelphia, PA (US); Carrie Norman, Frisco, TX (US); Abdelkader M'Hamed Benkreira, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/435,972

(22) Filed: Feb. 7, 2024

(65) Prior Publication Data

US 2024/0430180 A1    Dec. 26, 2024

Related U.S. Application Data

(63) Continuation of application No. 17/703,644, filed on Mar. 24, 2022, now Pat. No. 11,929,894, which is a continuation of application No. 17/075,070, filed on Oct. 20, 2020, now Pat. No. 11,316,760, which is a continuation-in-part of application No. 16/597,083,
(Continued)

(51) Int. Cl.
| | |
|---|---|
| *G06F 15/16* | (2006.01) |
| *G06N 20/00* | (2019.01) |
| *G06Q 10/06* | (2023.01) |
| *G06Q 30/016* | (2023.01) |
| *H04L 41/5074* | (2022.01) |

(Continued)

(52) U.S. Cl.
CPC ......... *H04L 41/5074* (2013.01); *G06N 20/00* (2019.01); *G06Q 10/06* (2013.01); *G06Q 30/016* (2013.01); *H04L 51/02* (2013.01); *H04L 41/5064* (2013.01)

(58) Field of Classification Search
CPC . H04L 41/5074; H04L 51/02; H04L 41/5064; G06N 20/00; G06Q 10/06; G06Q 30/016
USPC ..................................................... 709/223
See application file for complete search history.

(56) References Cited

U.S. PATENT DOCUMENTS 10,129,396 B1 * 11/2018 Desai .................. H04M 3/5191
10,257,351 B2 *  4/2019 Desai .................. H04M 7/0027
(Continued)

*Primary Examiner* — Imad Hussain
(74) *Attorney, Agent, or Firm* — Foley & Lardner LLP

(57) ABSTRACT

In some embodiments, a queue may be monitored to perform an automated adjustment related to a data item in the queue. In some embodiments, the data item may be associated with a product or service and include a code related to an access to the product or service. Based on the code, configuration information related to the product or service may be obtained. Based on a detected change related to the product or service, an indication of a set of self-support actions may be sent to a user device. One or more self-support actions (performed via the user device) may be determined, and an adjustment related to the access to the product or service may be performed based on the determined self-support actions. In some embodiments, the adjustment may include modifying a configuration of the access to the product or service based on the determined self-support actions.

20 Claims, 16 Drawing Sheets

Related U.S. Application Data filed on Oct. 9, 2019, now Pat. No. 11,165,670, which is a continuation of application No. 16/359,430, filed on Mar. 20, 2019, now Pat. No. 10,491,489, which is a continuation of application No. 16/180,859, filed on Nov. 5, 2018, now Pat. No. 10,263,862, said application No. 17/075,070 is a continuation-in-part of application No. 16/033,164, filed on Jul. 11, 2018.

(51) Int. Cl.
*H04L 51/02* (2022.01)
*H04L 41/5061* (2022.01)

(56) References Cited

U.S. PATENT DOCUMENTS

| | | | |
|---|---|---|---|
| 10,922,342 B2 * | 2/2021 | Wang | G06N 20/00 |
| 11,929,894 B2 * | 3/2024 | Edwards | H04L 43/0811 |

* cited by examiner

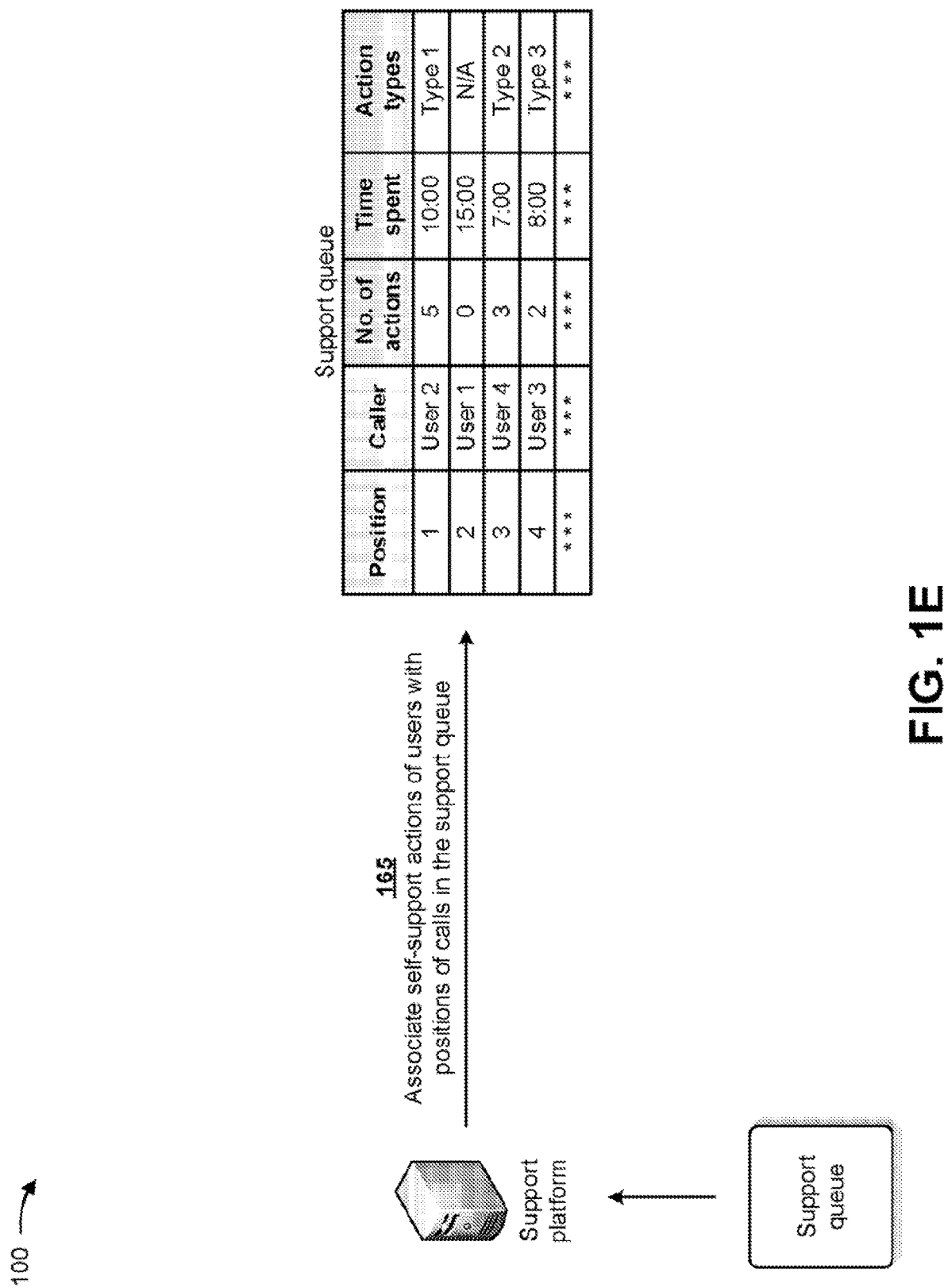

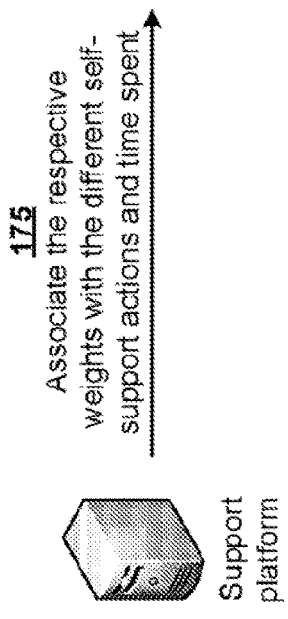
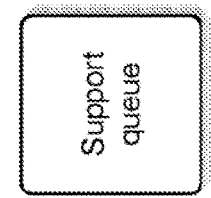
FIG. 1G

UTILIZING MACHINE LEARNING WITH SELF-SUPPORT ACTIONS

CROSS-REFERENCE TO RELATED APPLICATIONS

This application is a continuation of U.S. patent application Ser. No. 17/703,644, filed Mar. 24, 2022, which is a continuation of U.S. patent application Ser. No. 17/075,070, filed Oct. 20, 2020, which is continuation-in-part of U.S. patent application Ser. No. 16/033,164, filed Jul. 11, 2018, and a continuation-in-part of U.S. patent application Ser. No. 16/597,083, filed Oct. 9, 2019, which is a continuation of U.S. patent application Ser. No. 16/359,430, filed Mar. 20, 2019, which is a continuation of U.S. patent application Ser. No. 16/180,859, filed Nov. 5, 2018. Each of the foregoing applications is hereby incorporated by reference herein in its entirety.

BACKGROUND

User or customer self-support or self-service is a blend of user-initiated interaction technologies that are designed to enable users to provide support and/or services for themselves. Self-support may include providing computer-generated instructions for troubleshooting an issue, utilizing electronic records management systems, utilizing computer-generated chat and knowledge bases, and/or the like.

SUMMARY

In some embodiments, a queue may be monitored to perform an automated adjustment related to a data item in the queue. In some embodiments, the data item may be associated with a product or service and include a code related to an access to the product or service. Based on the code, configuration information related to the product or service may be obtained. Based on a detected change related to the product or service, an indication of a set of self-support actions may be sent to a user device. One or more self-support actions (performed via the user device) may be determined, and an adjustment related to the access to the product or service may be performed based on the determined self-support actions. In some embodiments, the adjustment related to the access to the product or service may include modifying a configuration of the access to the product or service based on the determined self-support actions.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

BRIEF DESCRIPTION OF THE DRAWINGS

FIGS. 1A-1K are diagrams of an example embodiment described herein.

DETAILED DESCRIPTION

Figure 1A:
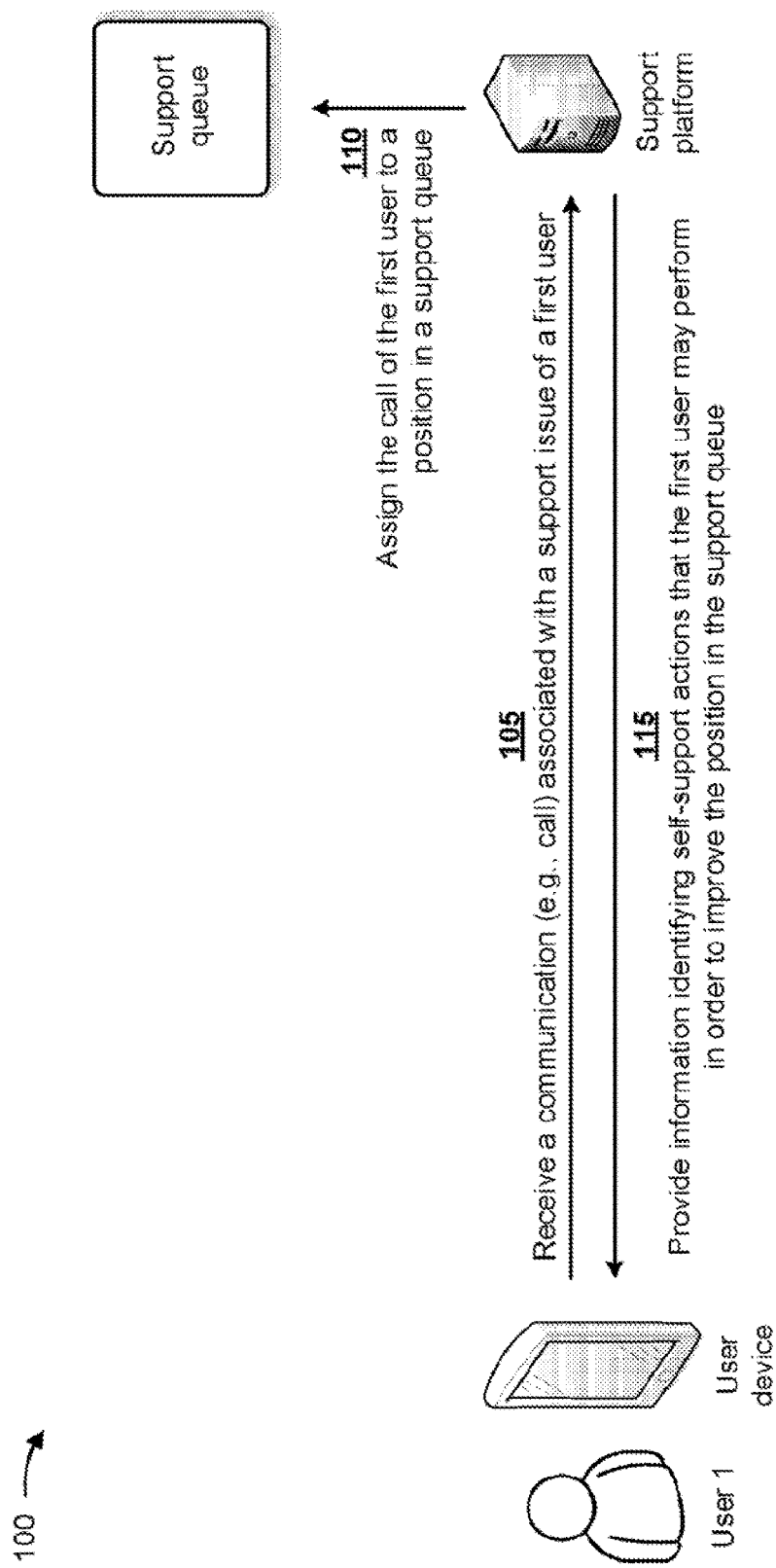

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Some embodiments described herein provide a support platform that utilizes machine learning with self-support actions to determine support queue positions for support calls. For example, the support platform may receive, from a user device, a communication associated with a support issue encountered by a user of the user device and may receive information identifying one or more self-support actions performed by the user in relation to the support issue. The support platform may assign the communication to a position in a support queue based on when the communication is received. The support queue may include information identifying positions of other communications received from other users, information identifying when the other communications were received, and information identifying self-support actions performed by the other users. The support platform may associate the information identifying the one or more self-support actions performed by the user with information identifying the position of the communication in the support queue and may apply respective weights to the one or more self-support actions performed by the user. The support platform may generate a score for the communication based on applying the respective weights and may modify the position of the communication in the support queue based on the score. The support platform may perform one or more actions based on modifying the position of the communication in the support queue.

In this way, the support platform may provide incentives for a user to try to solve problems using automated self-support tools or actions. The support platform may reduce a waiting time for a support call based on utilizing the automated self-support actions and based on a quantity of self-support actions performed by the user. The support platform may encourage users to utilize self-support actions rather than calling a service center, which may conserve resources (e.g., processing resources, memory resources, and/or the like) associated with processing service and/or support calls by the service center.

In some embodiments, one or more data feeds may be monitored for data streams from one or more sources, and one or more potential issues of a user may be determined based on the monitoring to proactively facilitate a resolution for the potential issues (e.g., by providing the user with information identifying self-support actions that the user may perform to help resolve an issue, automatically performing one or more of such identified self-support actions, etc.). In some embodiments, each such data feed may be configured to receive a continuous flow of updated application data from a corresponding real-time application. For example, an application may generate and output updated application data, which may be received by one of the data feeds. In some embodiments, each such data feed may be configured to receive updated application data for a predetermined amount of time. For example, the updated application data may be provided to a corresponding data feed within a data stream. In some cases, the updated application data may not be stored persistently by the corresponding data feed. In some cases, the updated application data may be buffered to local cache by a computing system associated with the data feed, which may be automatically deleted to receive new updated application data from the application.

As an example, a network application may detect a network connectivity issue related to a user's local network (e.g., high latency, lower download/upload rate typically experienced by the user while wirelessly connected to the user's local network, limited or no connectivity, etc.). Based on such detection, the network application may provide information identifying the network connectivity issue to a data feed being monitored by the support platform. Based on the network connectivity issue information, the support platform may determine one or more self-support actions and provide such self-support action information to the user (e.g., instructions for powering a router off and on, powering a modem off and on, checking an optical network terminal, checking for a power outage, or other actions). As another example, the support platform may request permission from the user to perform one or more of the foregoing self-support actions. Upon receiving the user's permission, the support platform may perform the corresponding actions (e.g., auto-rebooting a router, auto-rebooting a modem, or other actions).

In some embodiments, the support platform may provide the foregoing notifications/instructions to the user or automatically perform one or more actions to resolve an identified issue prior to the user discovering the issue or initiating a support call to a service center. In this way, for example, support calls to a service center may be reduced (e.g., by avoiding support calls for issues that are fully resolved for users via the self-support or automatically-performed actions, by decreasing the amount of time needed to address any remaining issues or work to resolve such issues, limiting the overall amount of time that users wait in the support queue, etc.), thereby conserving resources (e.g., processing resources, memory resources, etc.) associated with processing service and/or support calls by the service center. As discussed above, even if one or more issues may not be resolved after performing the self-support actions, the users may be rewarded for trying the self-support actions (e.g., by moving the users' positions up in a support queue, which reduces the users' respective wait times), thereby helping to improve the user experience.

FIGS. 1A-1K are diagrams of an example embodiment 100 described herein. As shown in FIGS. 1A-1K, a user device may be associated with a first user (e.g., User 1, a customer seeking customer support) and a support platform. The first user of the user device may utilize the user device to establish and/or provide a communication (e.g., a call, an instant message of an instant messaging session, video of a video session, and/or the like) with the support platform. In some embodiments, the communication may be associated with a support issue (e.g., a network outage, a service interruption, a user device issue, and/or the like) of the first user that is to be resolved by an entity associated with the support platform. As shown in FIG. 1A, and by reference number 105, the support platform may receive, from the user device, the communication associated with the support issue of the first user.

As further shown in FIG. 1A, and by reference number 110, the support platform may assign the call of the first user to a position in a support queue (e.g., based on when the call is received by the support platform). In some embodiments, the support queue may include a ranked list of communications (e.g., calls) received by the support platform from the first user and other users (e.g., associated with other user devices). In some embodiments, the support platform may rank the calls in the ranked list based on when the calls were received by the support platform. For example, an oldest call (e.g., a call that is received the earliest by the support platform) may be ranked first in the support queue, followed by a next oldest call, and/or the like. In some embodiments, the support queue may be stored in a data structure (e.g., a database, a table, a list, and/or the like) associated with the support platform. In some embodiments, the support platform may address the calls in the support queue based on the rankings of the calls (e.g., with a first ranked call being addressed first, followed by a second ranked call, and/or the like).

As further shown in FIG. 1A, and by reference number 115, the support platform may provide, to the user device, information identifying self-support actions that the first user may perform in order to improve the position of the call of the first user in the support queue. In some embodiments, the support platform may determine the self-support actions that the first user may perform based on the support issue of the first user and may provide, to the user device, information identifying the determined self-support actions. For example, if the support issue relates to a network connectivity issue, the self-support actions may include powering a router off and on, powering a modem off and on, checking an optical network terminal (ONT), checking for a power outage, and/or the like. In some embodiments, the support platform may automatically perform one or more of the determined self-support actions (e.g., with user permission) before recommending the self-support actions to the first user. In such embodiments, the support platform may or may not recommend the determined self-support actions that were automatically performed by the support platform. In some embodiments, the support platform may determine the self-support actions that the first user may perform based on information associated with the first user. For example, the first user may have an account and a user profile established with the support platform, and the support platform may utilize the account and the user profile to identify potential issues associated with the account and/or the user profile (e.g., a malfunctioning router) and to determine the self-support actions that the first user may perform to correct the potential issues.

Figure 1B:
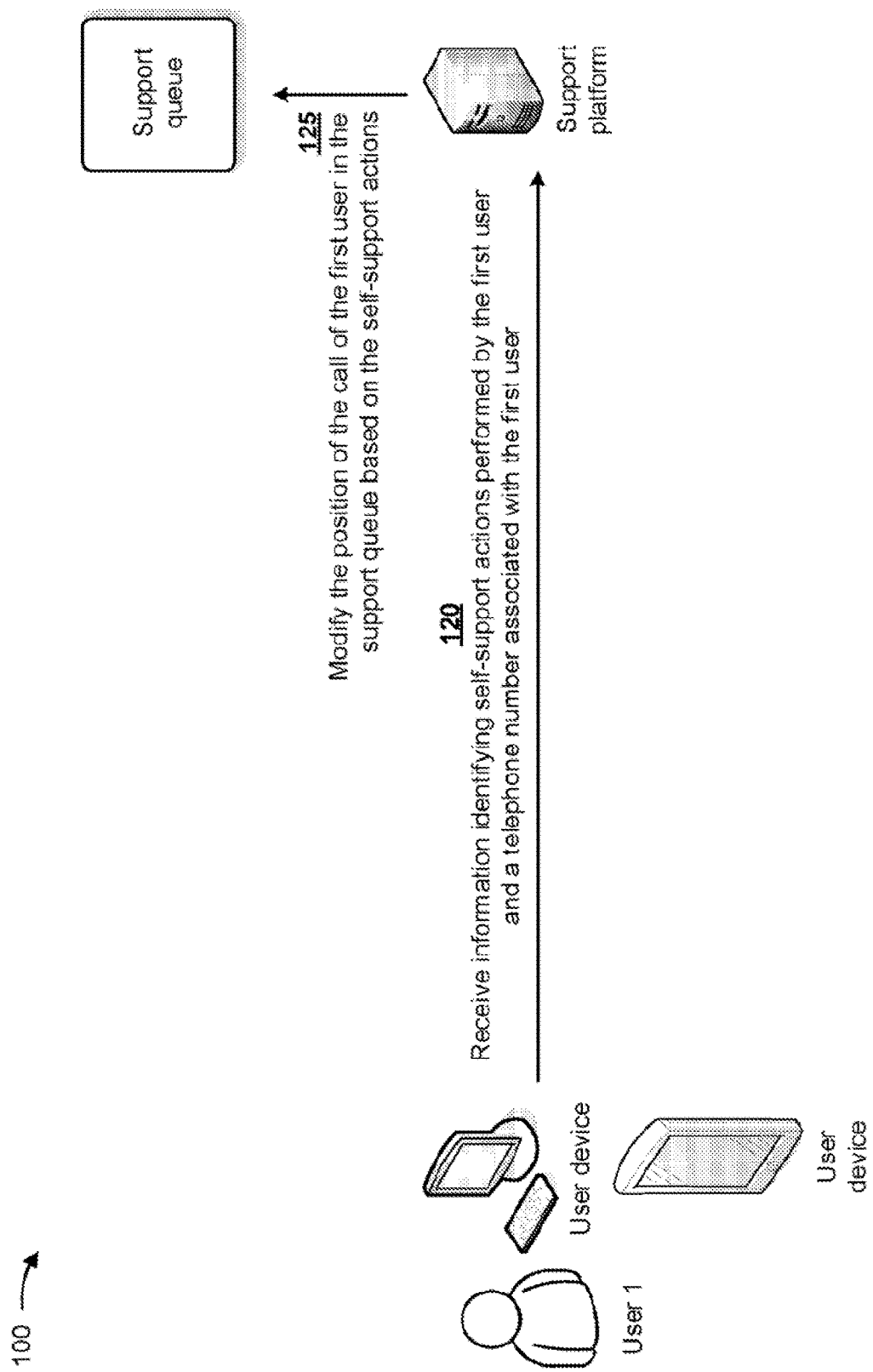

With reference to FIG. 1B, the first user may utilize the user device and/or another user device to perform self-support actions. In some embodiments, the first user may utilize the user device and/or the other device to perform one or more of the self-support actions recommended by the support platform, as described above in connection with FIG. 1A. As shown in FIG. 1B, and by reference number 120, the support platform may receive, from the user device and/or the other user device, information identifying the self-support actions performed by the first user and a telephone number associated with the first user (e.g., associated with the user device of the first user).

In some embodiments, the first user may not have an account with the support platform and may perform the self-support actions with the support platform via an unauthenticated session. In such embodiments, the support platform may utilize the telephone number associated with the first user to correlate the self-support actions performed by the first user with the position of the call in the support queue. In some embodiments, the first user may have an authenticated account with the support platform and may perform the self-support actions with the support platform via the authenticated account. In such embodiments, the support platform may recognize the telephone number associated with the first user, based on the authenticated account and may utilize the authenticated account and/or the telephone number to correlate the self-support actions performed by the first user with the position of the call in the support queue.

As further shown in FIG. 1B, and by reference number 125, the support platform may modify the position of the call of the first user in the support queue based on the self-support actions performed by the first user. In some embodiments, the support platform may upgrade the position of the call (e.g., from a fourth-ranked call to a second-ranked call) in the support queue based on the self-support actions performed by the first user, may maintain the position of the call (e.g., as the fourth-ranked call) in the support queue based on the self-support actions performed by the first user, may downgrade the position of the call (e.g., from a fourth-ranked call to a fifth-ranked call) in the support queue based on the self-support actions performed by the first user, and/or the like. Further details associated with modifying positions of calls in the support queue are provided below in connection with FIGS. 1E-1I.

Figure 1C:
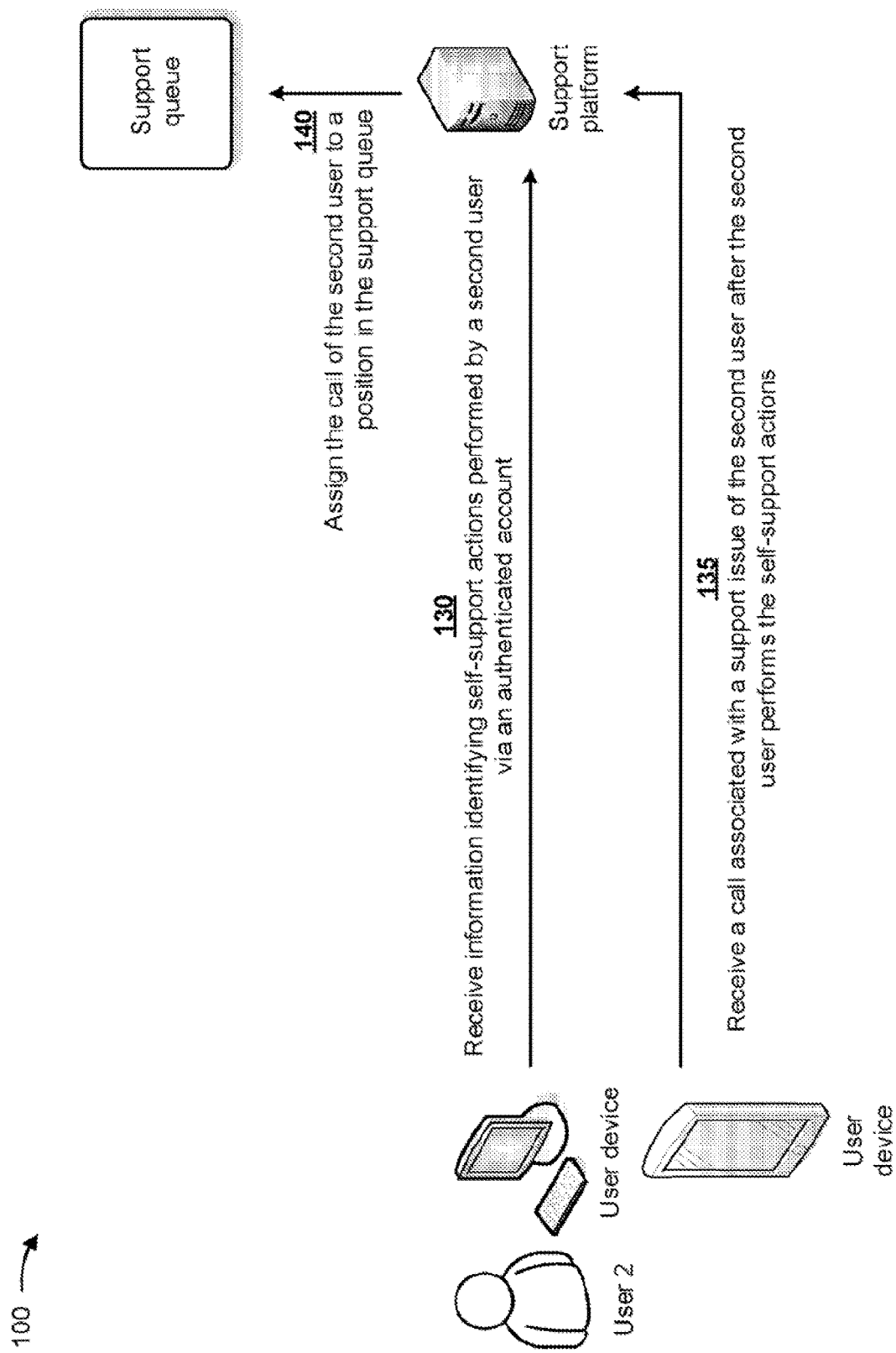

With reference to FIG. 1C, a second user may be associated with two user devices (e.g., a computer and a mobile telephone). In some embodiments, the second user may include an authenticated account with the support platform and may perform self-support actions (e.g., associated with a support issue) with the support platform via the authenticated account and one of the user devices. As shown in FIG. 1C, and by reference number 130, the support platform may receive, from one of the user devices, information identifying the self-support actions performed by the second user via the authenticated account.

As further shown in FIG. 1C, and by reference number 135, the support platform may receive, from one of the user devices, a call associated with the support issue of the second user after the user performs the self-support actions associated with the support issue via the authenticated account. In some embodiments, the support platform may recognize the telephone number associated with the second user (e.g., one of the user devices), based on the authenticated account and may utilize the authenticated account and/or the telephone number to correlate the self-support actions performed by the second user with the call in the support queue.

As further shown in FIG. 1C, and by reference number 140, the support platform may assign the call of the second user to a position in the support queue based on when the call was received by the support platform, based on the self-support actions performed by the second user, and/or the like. In some embodiments, the support platform may assign the call of the second user to the position in the support queue based on when the call was received and may modify the position of the call in the support queue based on the self-support actions performed by the second user. Further details associated with modifying positions of calls in the support queue are provided below in connection with FIGS. 1E-1I.

Figure 1D:
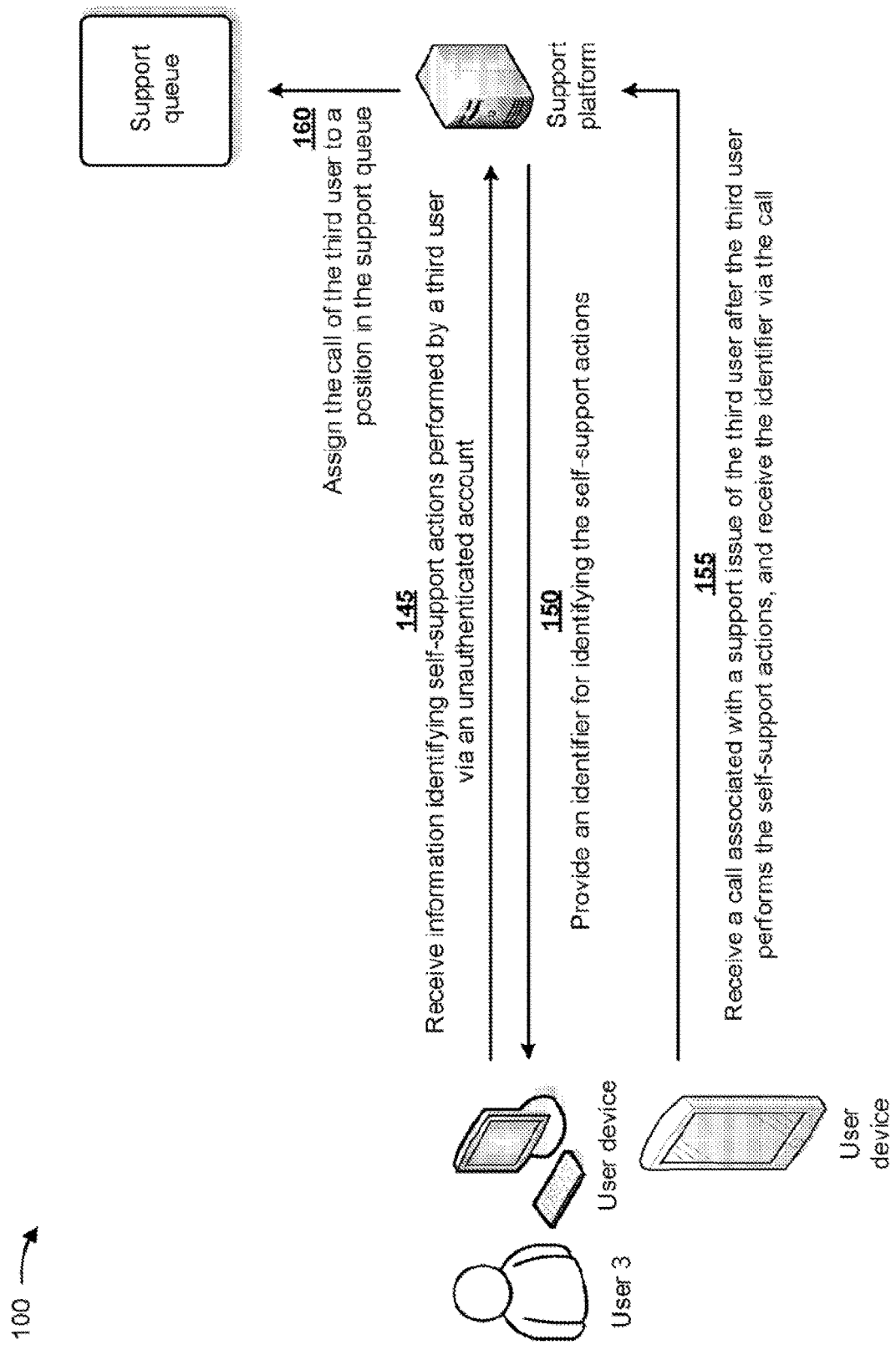

With reference to FIG. 1D, a third user may be associated with user devices (e.g., a computer and a mobile telephone). In some embodiments, the third user may not include an authenticated account with the support platform but may perform self-support actions (e.g., associated with a support issue) with the support platform via an unauthenticated account. As shown in FIG. 1D, and by reference number 145, the support platform may receive, from one of the user devices, information identifying the self-support actions performed by the third user via the unauthenticated account.

As further shown in FIG. 1D, and by reference number 150, the support platform may provide, to one of the user devices, an identifier for identifying the self-support actions performed by the third user via the unauthenticated account. In some embodiments, the identifier may include a number, alphanumeric characters, alphabetical characters, a passcode, a password, a pass phrase, and/or the like.

As further shown in FIG. 1D, and by reference number 155, the support platform may receive, from one of the user devices, a call associated with the support issue of the third user after the user performs the self-support actions associated with the support issue via the unauthenticated account. In some embodiments, the support platform may not recognize the telephone number associated with the third user (e.g., one of the user devices), since the third user does not have an authenticated account. Therefore, the support platform may request that the third user provide (e.g., via one of the user devices) the identifier for identifying the self-support actions performed by the third user. The support platform may receive, from one of the user devices, the identifier identifying the self-support actions performed by the third user based on the request. In some embodiments, the support platform may utilize the identifier to correlate the self-support actions performed by the third user with the call in the support queue.

As further shown in FIG. 1D, and by reference number 160, the support platform may assign the call of the third user to a position in the support queue based on when the call was received by the support platform, based on the self-support actions performed by the third user, and/or the like. In some embodiments, the support platform may assign the call of the third user to the position in the support queue based on when the call was received and may modify the position of the call in the support queue based on the self-support actions performed by the third user. Further details associated with modifying positions of calls in the support queue are provided below in connection with FIGS. 1E-1I.

As shown in FIG. 1E, and by reference number 165, the support platform may associate self-support actions of users with positions of calls in the support queue. In some embodiments, the support platform may associate the self-support actions of the users with the positions of the calls in the support queue as described above in connection with FIGS. 1A-1D. As further shown in FIG. 1E, the support queue may include a position field, a caller field, a number of actions field, a time spent field, an action types field, and a variety of entries associated with the fields. These are simply examples of fields that may be included in the support queue. In some embodiments, the support queue may include fewer or additional fields. For example, one or more of these fields may be provided in a data structure separate from the support queue.

The position field may include information indicating positions of calls within the support queue. For example, the position field may include a ranking number for each of the calls identified in the support queue. In some embodiments, a ranking number of one (1) may indicate a highest ranking and the next call to be serviced, two (2) may indicate a next highest ranking and the call to be serviced after the highest-ranked call, and/or the like. In some embodiments, the support queue may not include a position field and a ranking of a call within the support queue may be determined based on where the call is identified within the support queue (e.g., a call that is identified closer to a front (or top) of the support queue may be ranked higher than another call that is identified farther from the front (or top) of the support queue).

The caller field may include information identifying callers (e.g., users) associated with calls (e.g., or other communications) provided to the support platform. For example, the caller field may indicate that the second user (User 2) is associated with the first-ranked call, the first user (User 1) is associated with the second-ranked call, a fourth user (User 4) is associated with the third-ranked call, the third user (User 3) is associated with the fourth-ranked call, and/or the like.

The number of actions field may include information identifying a quantity of self-support actions performed by the users identified in the caller field. For example, the number of actions field may indicate that the second user performed five self-support actions, the first user performed zero self-support actions, the fourth user performed three self-support actions, the third user performed two self-support actions, and/or the like.

The time spent field may include information identifying an amount of time waiting for a call to be serviced; an amount of time spent, by the users identified in the caller field, performing the self-support actions; and/or the like. For example, the time spent field may indicate that the second user spent ten minutes waiting for service and/or performing the self-support actions, the first user spent fifteen minutes waiting for service, the fourth user spent seven minutes waiting for service and/or performing the self-support actions, the third user spent eight minutes waiting for service and/or performing the self-support actions, and/or the like.

The action types field may include information identifying the types of self-support actions performed by the users identified in the caller field. For example, the action types field may indicate that the second user performed Type 1 self-support actions, the first user performed no self-support actions, the fourth user performed Type 2 self-support actions, the third user performed Type 3 self-support actions, and/or the like. In some embodiments, a user may perform multiple self-support actions that are of different types. For example, the second user may perform five actions of Types 1, 2, and 3.

Although FIG. 1E depicts particular information in the support queue, in some embodiments, the support queue may include additional information, different information, less information, and/or the like.

Figure 1F:
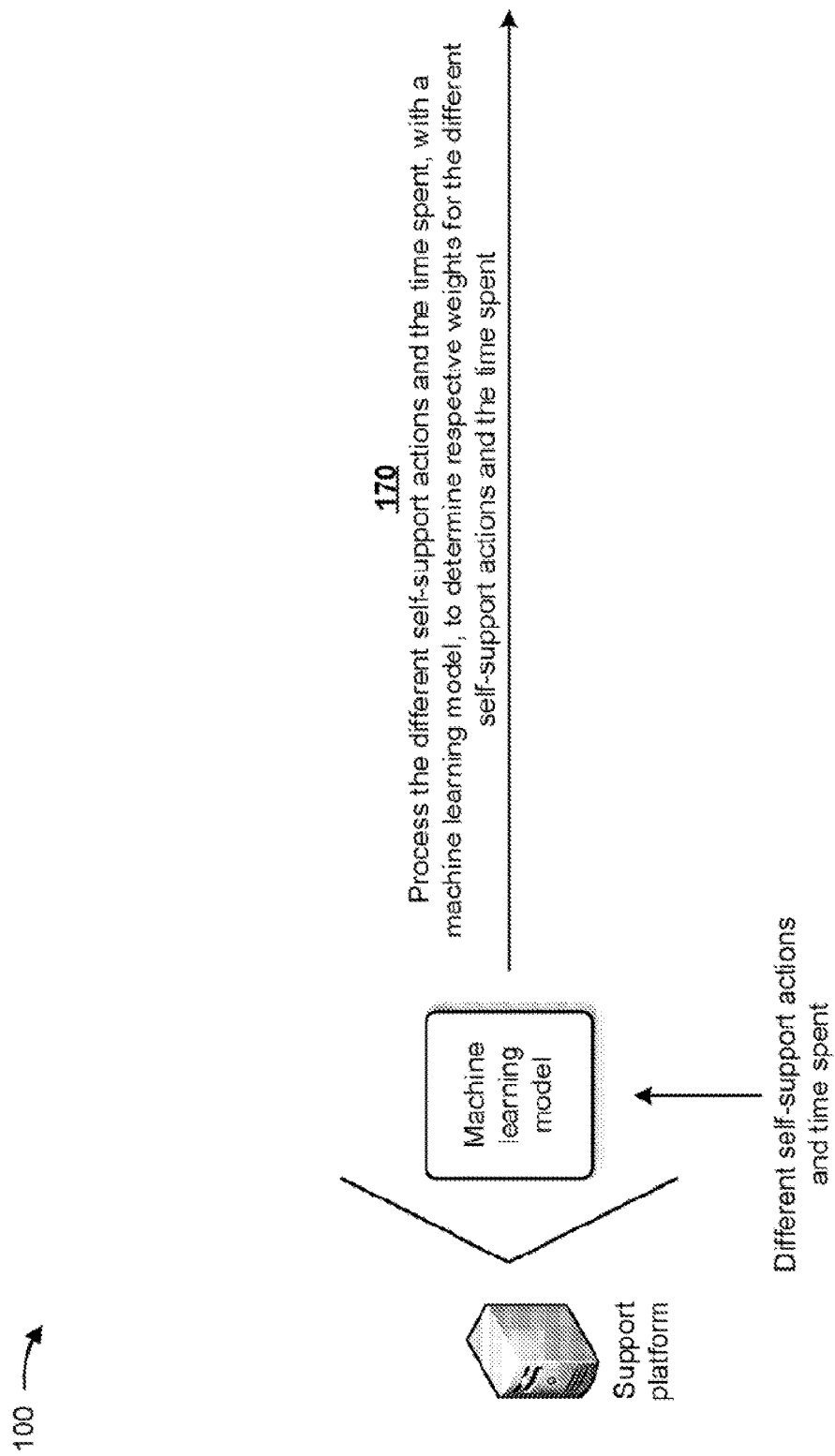

As shown in FIG. 1F, and by reference number 170, the support platform may process information identifying different self-support actions and time spent performing the different self-support actions (e.g., provided in the support queue) with a machine learning model, to determine respective weights for the different self-support actions and/or the time spent performing the different self-support actions. In some embodiments, the machine learning model may include a pattern recognition model that generates the respective weights for the different self-support actions and/or the time spent performing the different self-support actions.

In some embodiments, the support platform may perform a training operation on the machine learning model, with historical self-support information associated with previously performed self-support actions. The historical self-support information may include information indicating difficulties associated with the self-support actions, time spent performing the self-support actions, results of performing the self-support actions (e.g., support issues resolved, almost resolved, not resolved, etc.), time savings by support personnel based on the self-support actions (e.g., when users performed self-support action X, it resulted in less time spent by support personnel troubleshooting a support issue, which conserves resources), and/or the like.

The support platform may separate the historical self-support information into a training set, a validation set, a test set, and/or the like. The training set may be utilized to the train the machine learning model. The validation set may be utilized to validate results of the trained machine learning model. The test set may be utilized to test operations of the machine learning model. In some embodiments, the support platform may train the machine learning model using, for example, an unsupervised training procedure and based on the historical self-support information. For example, the support platform may perform dimensionality reduction to reduce the historical self-support information to a minimum feature set, thereby reducing resources (e.g., processing resources, memory resources, and/or the like) to train the machine learning model and may apply a classification technique to the minimum feature set.

In some embodiments, the support platform may use a logistic regression classification technique to determine a categorical outcome (e.g., that the historical self-support information indicates certain results). Additionally, or alternatively, the support platform may use a naïve Bayesian classifier technique. In this case, the support platform may perform binary recursive partitioning to split the historical self-support information into partitions and/or branches, and use the partitions and/or branches to perform predictions (e.g., that the historical self-support information indicates certain results). Based on using recursive partitioning, the support platform may reduce utilization of computing resources relative to manual, linear sorting and analysis of data points, thereby enabling use of thousands, millions, or billions of data points to train the machine learning model, which may result in a more accurate model than using fewer data points.

Additionally, or alternatively, the support platform may use a support vector machine (SVM) classifier technique to generate a non-linear boundary between data points in the training set. In this case, the non-linear boundary is used to classify test data into a particular class.

Additionally, or alternatively, the support platform may train the machine learning model using a supervised training procedure that includes receiving input to the machine learning model from a subject matter expert, which may reduce an amount of time, an amount of processing resources, and/or the like to train the machine learning model relative to an unsupervised training procedure. In some embodiments, the support platform may use one or more other model training techniques, such as a neural network technique, a latent semantic indexing technique, and/or the like. For example, the support platform may perform an artificial neural network processing technique (e.g., using a two-layer feedforward neural network architecture, a three-layer feedforward neural network architecture, and/or the like) to perform pattern recognition with regard to patterns of the historical self-support information.

In this case, using the artificial neural network processing technique may improve an accuracy of the trained machine learning model generated by the support platform by being more robust to noisy, imprecise, or incomplete data, and by enabling the support platform to detect patterns and/or trends undetectable to human analysts or systems using less complex techniques.

As shown in FIG. 1G, and by reference number 175, the support platform may associate the respective weights with the different self-support actions and/or the time spent performing the different self-support actions. In some embodiments, different self-support actions may include different weights. For example, if a self-support action typically solves a support issue, the self-support action may be allotted a greater weight than another self-support action that does not typically solve a support issue. In another example, if a self-support action requires a greater amount of time to perform than another self-support action, the self-support action may be allotted a greater weight than the other self-support action. In still another example, if a self-support action conserves more resources for the support platform than another self-support action, the self-support action may be allotted a greater weight than the other self-support action.

As further shown in FIG. 1G, the support queue may include a weights field that provides information identifying the respective weights associated with the different self-support actions and/or the time spent performing the different self-support actions. For example, the weights field may indicate that weights of 0.1 and 0.2 are associated with the different self-support actions and/or the time spent performing the different self-support actions by the second user, a weight of 0.0 is associated with the different self-support actions and/or the time spent performing the different self-support actions by the first user, weights of 0.5 and 0.5 are associated with the different self-support actions and/or the time spent performing the different self-support actions by the fourth user, a weight of 0.7 is associated with the different self-support actions and/or the time spent performing the different self-support actions by the third user, and/or the like. In some embodiments, a user may perform multiple self-support actions and the same or different weights may be associated with each of the multiple self-support actions.

Figure 1H:
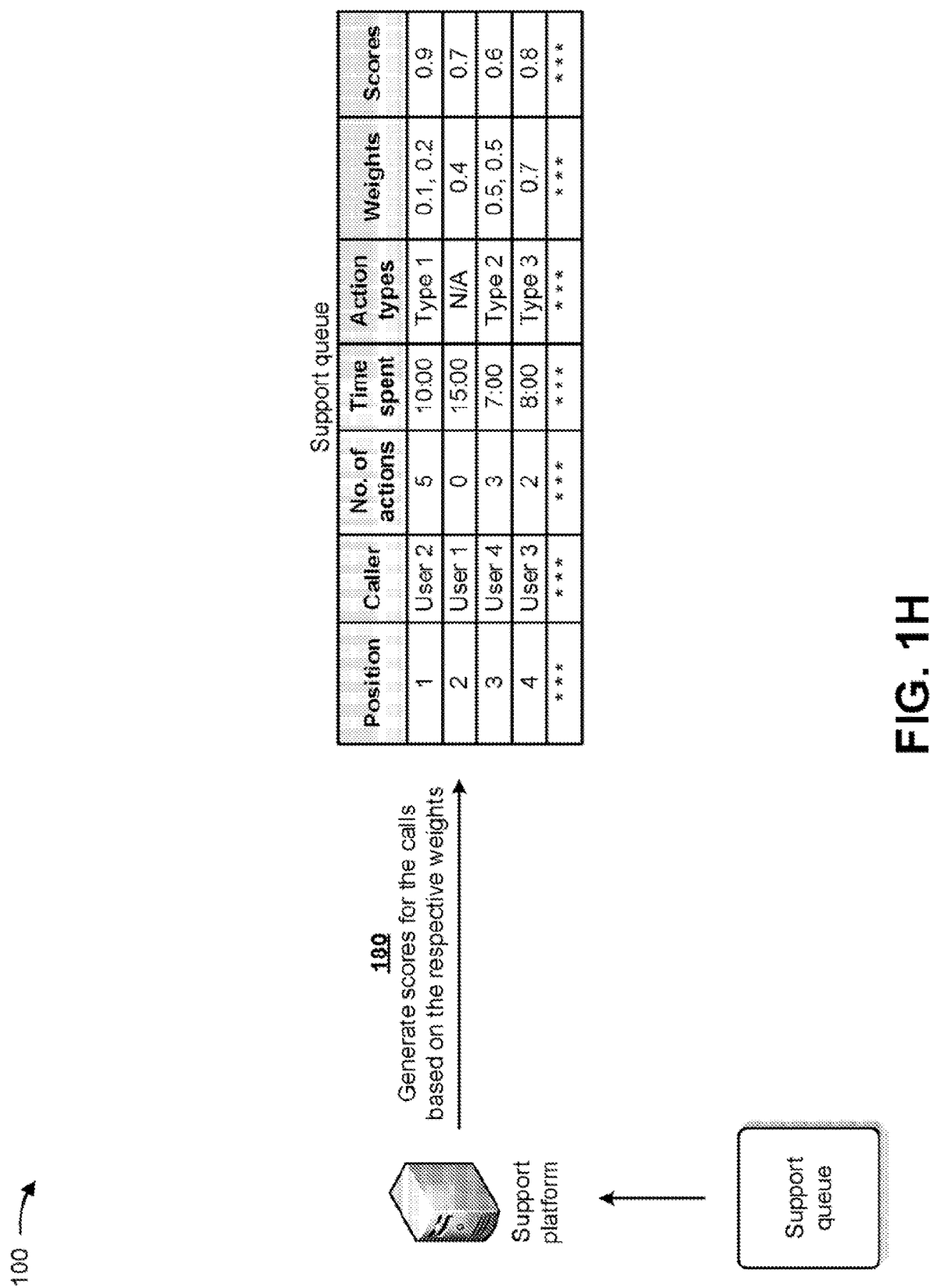

As shown in FIG. 1H, and by reference number 180, the support platform may generate scores for the calls based on the respective weights associated with the different self-support actions and/or the time spent performing the different self-support actions. In some embodiments, different calls may include different scores based on the respective weights associated with the different self-support actions and/or the time spent performing the different self-support actions. For example, if a call is associated with one or more respective weights that are greater than one or more respective weights associated with another call, the call may receive a higher score than the other call. In another example, if a call is associated with one or more respective weights that are less than one or more respective weights associated with another call, the call may receive a lower score than the other call.

As further shown in FIG. 1H, the support queue may include a scores field that provides information identifying the scores generated for respective calls. For example, the scores field may indicate that the call associated with the second user has a score of 0.9, the call associated with the first user has a score of 0.7, the call associated with the fourth user has a score of 0.6, the call associated with the third user has a score of 0.8, and/or the like.

Figure 1I:
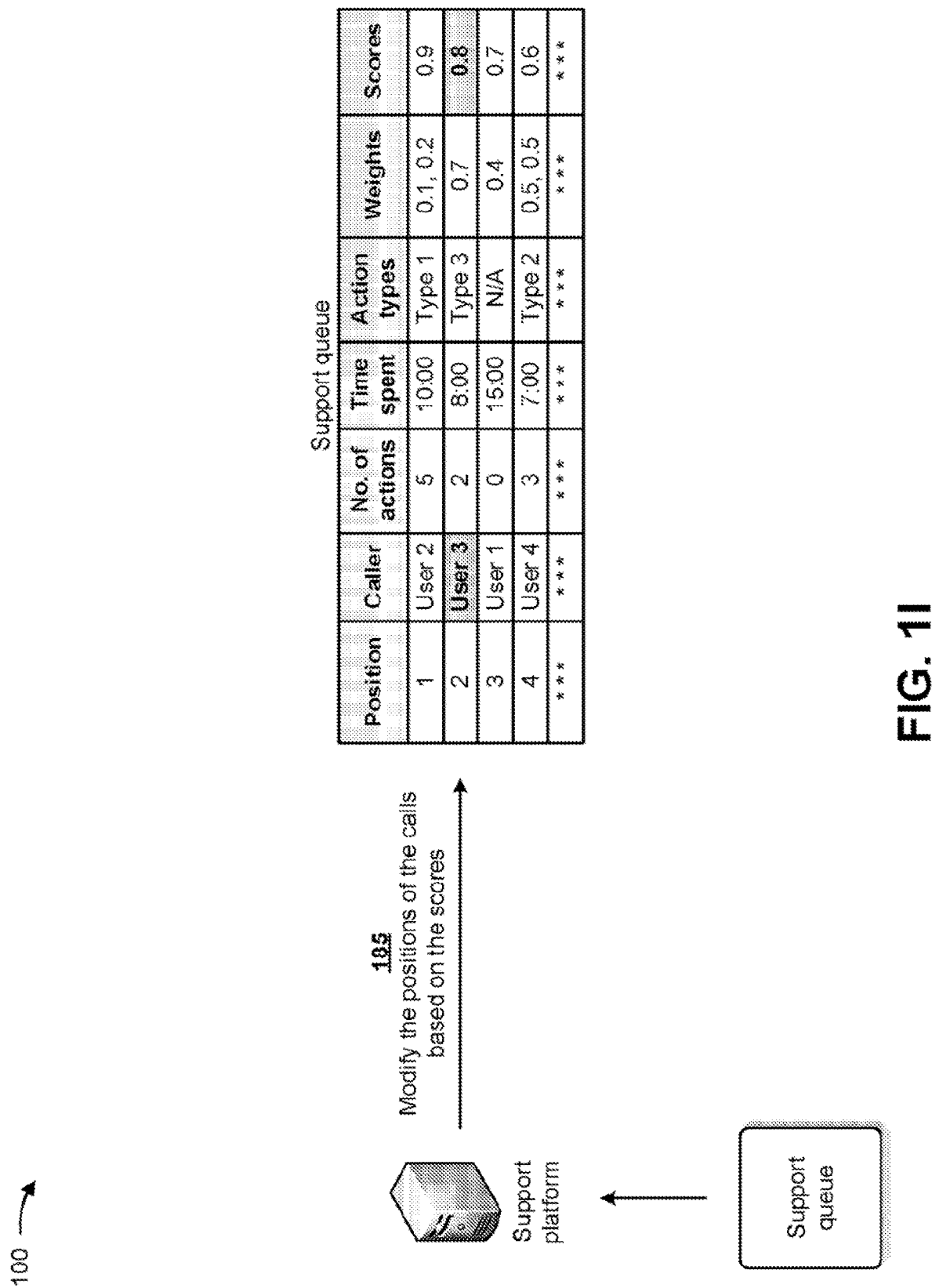

As shown in FIG. 1I, and by reference number 185, the support platform may modify positions of the calls in the support queue based on the scores generated for the calls based on the respective weights. In some embodiments, the support platform may re-rank the calls in the support queue based on the scores generated for the calls. In such embodiments, a call associated with a greatest score may be ranked first (e.g., position 1), a call associated with a next greatest score may be ranked second (e.g., position 2), and/or the like. For example, as shown in FIG. 1I, and with reference to FIG. 1H, the call associated with the third user may be moved from the fourth position to the second position (e.g., since the call has a score of 0.8), the call associated with the first user may be moved from the second position to the third position (e.g., since the call has a score of 0.7), and the call associated with the fourth user may be moved from the third position to the fourth position (e.g., since the call has a score of 0.6).

Figure 1J:
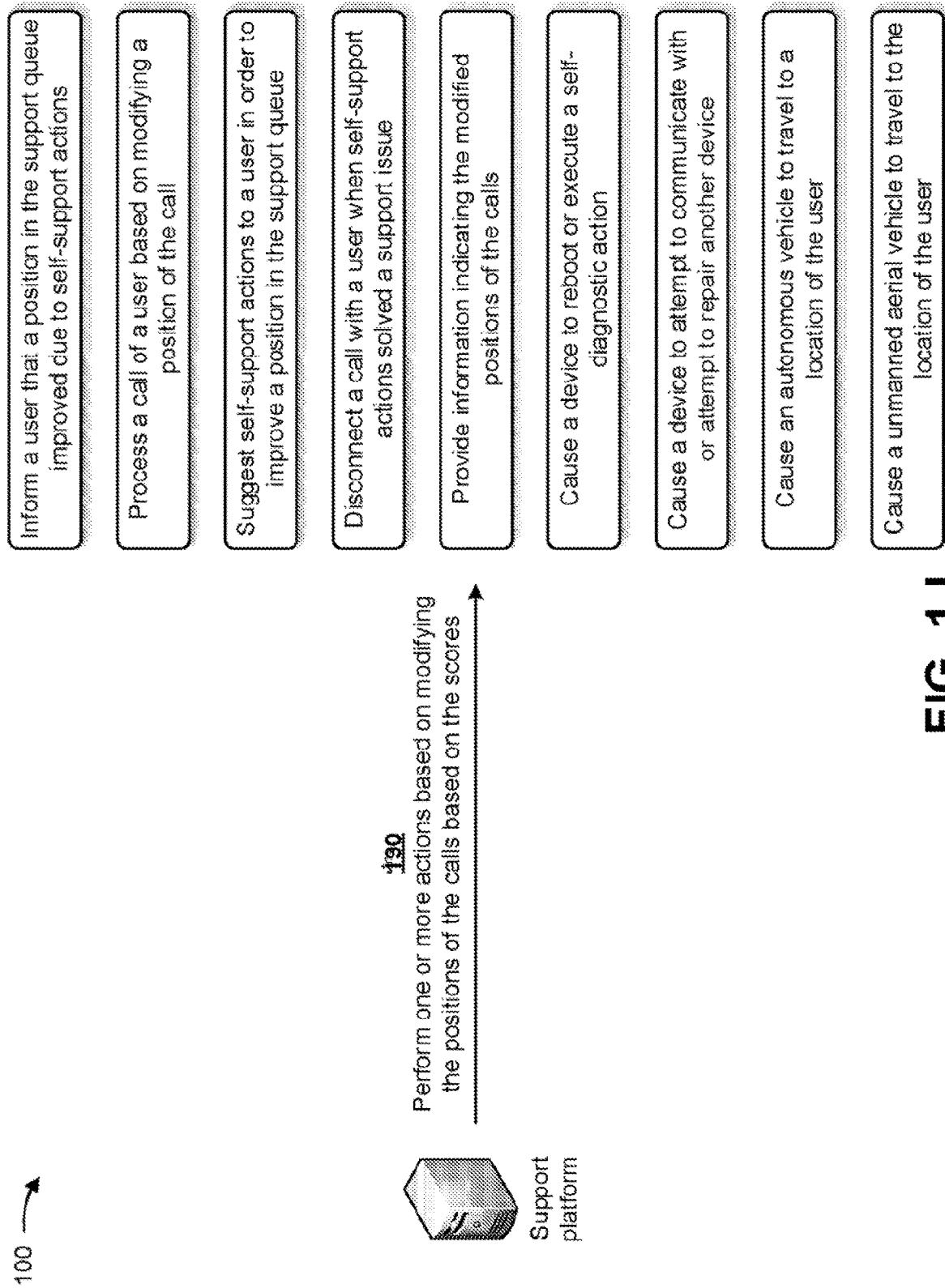

As shown in FIG. 1J, and by reference number 190, the support platform may perform one or more actions based on modifying the positions of the calls in the support queue (e.g., based on the scores). For example, the one or more actions may include the support platform informing a user (e.g., via a user device) that the user's position in the support queue improved due to the user performing self-support actions. In this way, the user may be encouraged to continue performing the self-support actions and resolve the support issue, which may conserve resources that would otherwise be wasted in attempting to resolve the support issue without the user having performed the self-support actions. Furthermore, as more self-support actions are performed by the user, more data is collected for the machine learning model and resolution of a support issue may be more quickly achieved.

In some embodiments, the one or more actions may include the support platform processing a call of a user based on modifying a position of the call. For example, the position of the call may be moved to the top of the support queue and may be immediately processed. In this way, the call may be handled sooner than if the position of the call was not modified, which may conserve resources on the user device that would otherwise be wasted waiting in the support queue and may conserve network resources that would otherwise be wasted to maintain the call.

In some embodiments, the one or more actions may include the support platform suggesting self-support actions to a user (e.g., a user device) to improve a position of the call in the support queue. In this way, the support platform may encourage the user to perform self-support actions and potentially resolve the support issue, which may conserve resources that would otherwise be wasted in attempting to resolve the support issue without the user having performed the self-support actions. Furthermore, as more self-support actions are performed by the user, more data is collected for the machine learning model and resolution of a support issue may be more quickly achieved.

In some embodiments, the one or more actions may include the support platform disconnecting a call with a user (e.g., a user device) when self-support actions performed by the user solved a support issue. In this way, the support platform may conserve resources (e.g., processing resources, memory resources, network resources, and/or the like) associated with unnecessarily processing a call.

In some embodiments, the one or more actions may include the support platform providing (e.g., to user devices associated with users) information indicating positions of the calls in the support queue. In this way, the positions of the calls may encourage the users to perform self-support actions to improve the positions, which may conserve resources that would otherwise be wasted in attempting to resolve the support issue without the users having performed the self-support actions. Furthermore, as more self-support actions are performed by the users, more data is collected for the machine learning model and resolutions of support issues may be more quickly achieved.

In some embodiments, the one or more actions may include the support platform causing a device (e.g., a non-operational problem device in a network) to reboot or execute a self-diagnostic action. In this way, the support platform may resolve a support issue associated with the device, which may conserve resources on the user device that would otherwise be wasted waiting in the support queue and may conserve network resources that would otherwise be wasted to maintain the call.

In some embodiments, the one or more actions may include the support platform causing a device to attempt to communicate with another device (e.g., a non-operational problem device) and/or causing the device to attempt to diagnose or repair the other device. In this way, the support platform may attempt to resolve a support issue associated with the other device, which may conserve resources that would otherwise be wasted in attempting to resolve the support issue without the users having performed the self-support actions.

In some embodiments, the one or more actions may include the support platform causing an autonomous vehicle to travel to a location of a user (e.g., to provide a technician or the user with tools, diagnostic equipment, repair equipment, replacement equipment, and/or the like). In this way, the support platform may take preemptive actions to resolve a support issue, which may conserve resources on the user device that would otherwise be wasted waiting in the support queue and may conserve network resources that would otherwise be wasted to maintain the call.

In some embodiments, the one or more actions may include the support platform causing an unmanned aerial vehicle (UAV) to travel to a location of the user (e.g., to provide a technician or the user with tools, diagnostic equipment, repair equipment, replacement equipment, and/or the like). In this way, the support platform may take preemptive actions to resolve a support issue, which may conserve resources on the user device that would otherwise be wasted waiting in the support queue and may conserve network resources that would otherwise be wasted to maintain the call.

In some embodiments, the support platform may perform the one or more actions based on positions in the support queue for the calls, inferences of the support issues associated with the calls (e.g., determined based on the self-support actions performed by the users), and/or the like.

Figure 1K:
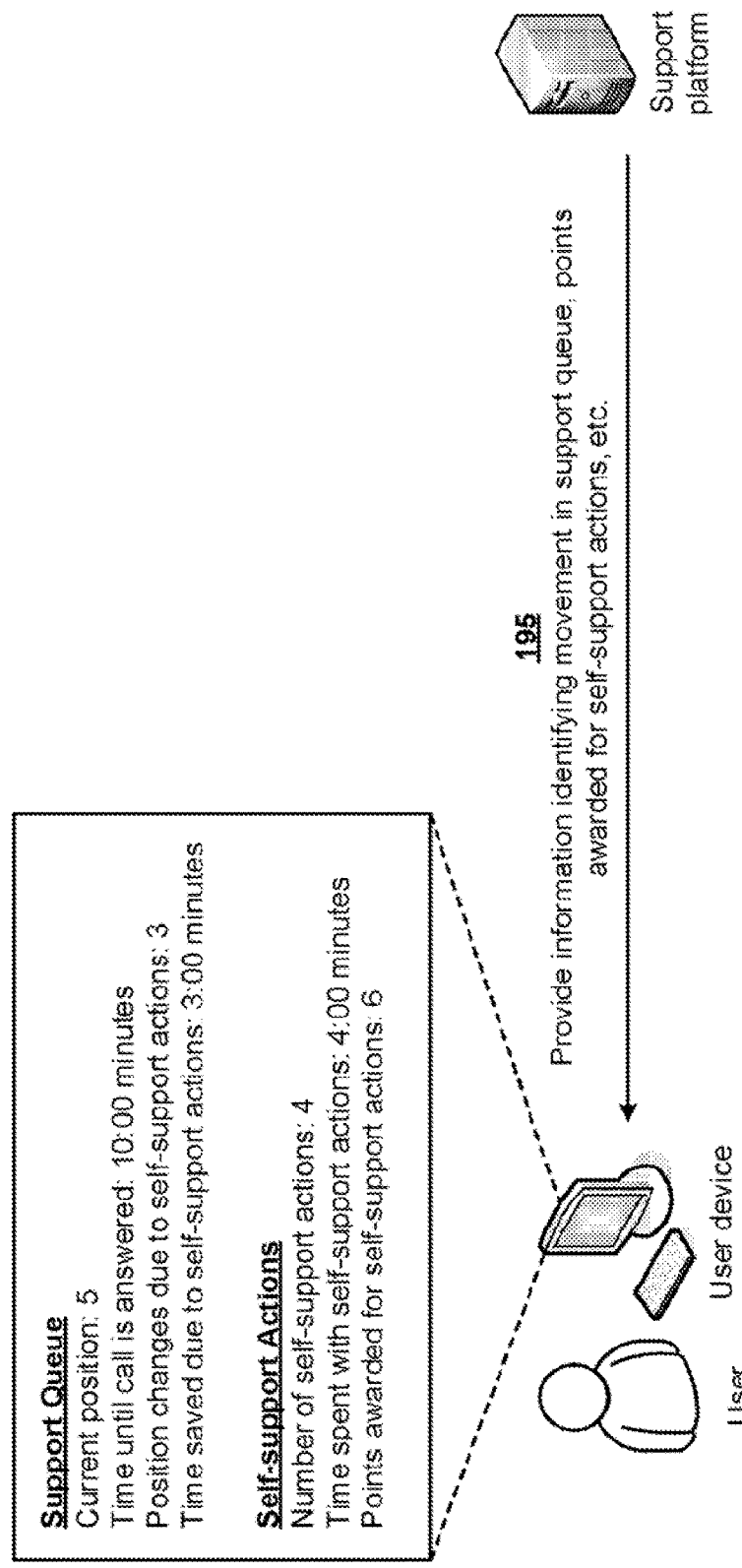

As shown in FIG. 1K, and by reference number 195, the support platform may provide, to a user device associated with a user, information identifying movement in the support queue for the user, points awarded for self-support actions performed by the user, and/or the like. In some embodiments, the user device may receive the information identifying the movement in the support queue for the user, points awarded for self-support actions performed by the user, and/or the like and may present the information via a user interface to the user. For example, as shown in FIG. 1K, the user interface may include information indicating that the user's current position in the support queue is fifth, a time until the user's call is answered is ten minutes, position changes for the user in the support queue is three, time saved by the user due to self-support actions is three minutes, the user performed four self-support actions, the user spent four minutes with the self-support actions, the user was awarded six points for the self-support actions, and/or the like.

In this way, several different stages of the process for determining support queue positions for support calls are automated with machine learning, which may remove human subjectivity and waste from the process, and which may improve speed and efficiency of the process and conserve computing resources (e.g., processing resources, memory resources, and/or the like). Furthermore, embodiments described herein use a rigorous, computerized process to perform tasks or roles that were not previously performed or were previously performed using subjective human intuition or input. For example, currently there does not exist a technique that utilizes machine learning with self-support actions to determine support queue positions for support calls. Finally, automating the process for determining support queue positions for support calls conserves computing resources (e.g., processing resources, memory resources, and/or the like) that would otherwise be wasted in attempting to process support calls.

As indicated above, FIGS. 1A-1K are provided merely as examples. Other examples may differ from what is described with regard to FIGS. 1A-1K.

In some embodiments, one or more data feeds may be monitored for data streams from one or more sources, and one or more potential issues of a user may be determined based on the monitoring to proactively facilitate a resolution for the potential issues. As indicated in one or more of the foregoing examples, in some embodiments, a support platform may provide the user with information identifying self-support actions that the user may perform to help resolve an issue. When such self-support action information is provided to the user prior to the user discovering the issue or initiating a support call to a service center, support calls to a service center may be reduced (e.g., by avoiding support calls for issues that are fully resolved for users via the self-support actions, by decreasing the amount of time needed to address any remaining issues or work to resolve such issues, limiting the overall amount of time that users wait in the support queue, etc.), thereby conserving resources (e.g., processing resources, memory resources, etc.) associated with processing service and/or support calls by the service center.

As an example, a network application may detect a network connectivity issue related to a user's local network (e.g., high latency, lower download/upload rate typically experienced by the user while wirelessly connected to the user's local network, limited or no connectivity, etc.). Based on such detection, the network application may provide information identifying the network connectivity issue to a data feed being monitored by the support platform. Based on the network connectivity issue information, the support platform may determine one or more self-support actions and provide such self-support action information to the user (e.g., instructions for powering a router off and on, powering a modem off and on, checking an optical network terminal, checking for a power outage, or other actions).

As another example, when a potential issue is detected (e.g., in real-time) for the user by monitoring a transaction queue, the support platform may determine one or more actions performable by the user and send a notification to a user device of the user regarding such actions. As a further example, the monitoring may indicate a fraudulent transaction, a transaction that needs additional verification, or other potential issues (e.g., the user overpaid or paid for an unnecessary item, the same product/service is available at a lower price, a better bundle is available at the same or lower price, etc.). In one use case, if the support platform detects that the user has purchased car rental insurance when renting a car (and car rental insurance is already provided by the transaction card account used to make the car rental purchase), the support platform may send a notification to the user device to inform the user of the additional fee paid by the user and provide the user with instructions to cancel the additional fee. If the user additionally needs to make a call to a support service to perform the cancellation, the support platform may add a priority to the user's call (e.g., based on respective weights for any self-support actions performed by the user), which will cause an adjustment of the position of the user in a support queue of the support service, in accordance with one or more techniques described herein.

In some embodiments, if a certain type of product or service purchase of the user is detected in a transaction queue, a support platform may generate a request for emails of an email account of the user (e.g., from an email service hosting the email account) based on the detected data (e.g., a transaction time of the purchase, the merchant or other entity from which the purchase was made, a confirmation code for the purchase, etc.) to obtain information that is used to determine one or more actions to be performed (e.g., self-support actions to be performed by the user). Such retrieval of emails may, for example, be performed in accordance with one or more techniques described in U.S. patent application Ser. No. 16/033,164, filed Jul. 11, 2018, incorporated by reference herein. As an example, the support platform may generate the request to be limited to emails within a predetermined threshold of the transaction time of the purchase (e.g., within one hour of the transaction time, within six hours of the transaction time, within one day of the transaction time, or other limited time period). In one scenario, with respect to the foregoing car rental use case, when the car rental purchase is detected in the transaction queue, the support platform may generate a request for emails (e.g., limited to one hour of the transaction time of the car rental purchase) and process the retrieved emails to identify one or more emails related to the car rental purchase, which the support platform may use to determine or confirm that the user has purchased car rental insurance when renting a car with a transaction card account that already provides the user with car rental insurance for the car rental. In this way, for example, the support platform may mitigate resource usage (e.g., processing resources, memory resources, network resources, etc.) associated with downloading or processing emails (e.g., as compared to downloading and processing all of the emails sent to the user's email account on a periodic basis).

In some embodiments, if a certain type of product or service purchase of the user is detected in a transaction queue, a support platform may generate an event listener (e.g., at one or more other data feeds) configured to listen for one or more changes in one or more aspects of the product or service (e.g., a lower price, available seating or capacity related to a user preference, additional options provided for the same price, etc.). When such changes are detected via the event listener, the support platform may determine the actions to be performed by the user and send the notification to the user device regarding such actions. In some embodiments, the support platform may determine an expiration time for the event listener based on the type of product or service purchased by the user and configure the event listener to expire in accordance with the expiration time. As an example, for flight purchases, the expiration time may be set to 24 hours (or other time period) after the transaction time of a flight purchase to mitigate the amount of computing resources necessary to maintain such event listeners.

In one scenario, if a flight purchase is detected in the transaction queue, the support platform (e.g., via a flight monitoring server) may generate an event listener to listen for a decrease in price (e.g., for the same flight), a seating availability change (e.g., for a seat matching the user's preference), or other changes related to the flight. In response to such a change detected via the event listener (or to obtain additional information to determine one or more parameters to generate the event listener), the support platform may generate a request for emails (e.g., limited to one hour of the transaction time of the flight purchase or other time period) and process the retrieved emails to identify one or more emails related to the flight purchase. The support platform may then use the identified emails to determine one or more actions to be performed (e.g., self-support actions to be performed by the user), such as rebooking the flight, modifying the seat selection, providing user confirmation for the support platform to initiate the foregoing, or other actions.

As indicated in one or more of the foregoing examples, in some embodiments, one or more self-support actions (performable by a user) may be automatically performed by a support platform to proactively facilitate a resolution for one or more potential issues, which may also reduce support calls to a service center (e.g., by avoiding support calls for issues that are fully resolved for users via the automatically-performed actions, by decreasing the amount of time needed to address any remaining issues or work to resolve such issues, limiting the overall amount of time that users wait in the support queue, etc.), thereby conserving resources (e.g., processing resources, memory resources, etc.) associated with processing service and/or support calls by the service center (e.g., that might occur in the future). As indicated above, if a user additionally needs to make a call to a support service to complete resolution of one or more issues, the support platform may add a priority to the user's call (e.g., based on respective weights for any self-support actions performed by the user), which will cause an adjustment of the position of the user in a support queue of the support service, in accordance with one or more techniques described herein.

In one use case, with respect to the foregoing network connectivity example, the support platform may automatically perform the corresponding actions (e.g., auto-rebooting a router, auto-rebooting a modem, or other actions) to proactively resolve the network connectivity issues. In a further use case, the support platform may request permission from the user to perform one or more of the foregoing self-support actions. Upon receiving the user's permission, the support platform may perform the foregoing actions.

In another use case, with respect to the foregoing flight purchase scenario, the support platform may automatically rebook a flight at a lower price, modify the seating selection to match the user's seating preference, or perform other actions (e.g., when the event listener detects the price change within a predetermined time period, the seating availability change within a predetermined time period, etc.). In a further use case, the support platform may automatically request user confirmation for the support platform to initiate one or more of the foregoing actions.

Figure 2:
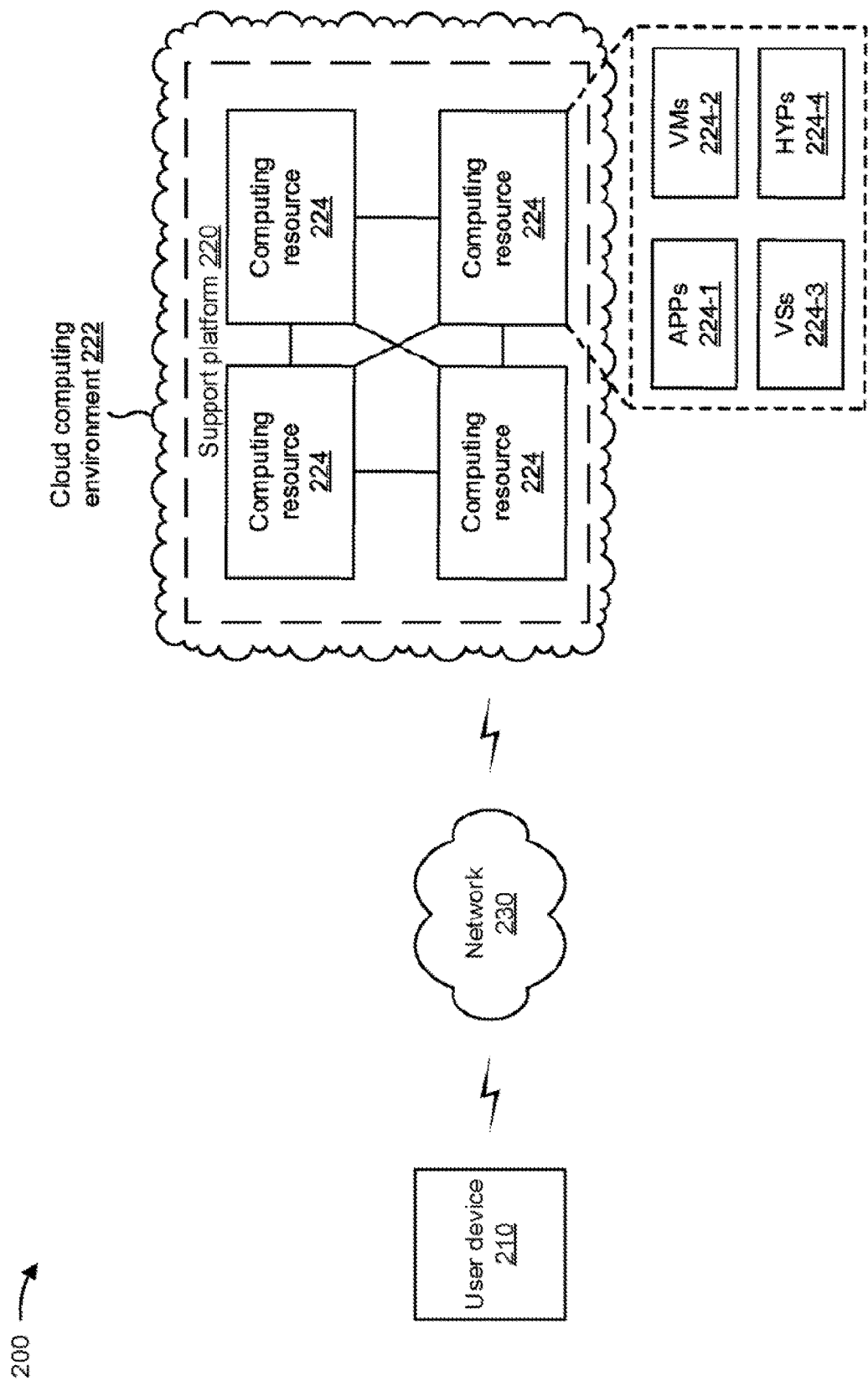
FIG. 2 is a diagram of an example environment in which systems and/or methods, described herein, may be implemented, in accordance with one or more embodiments.

FIG. 2 is a diagram of an example environment 200 in which systems and/or methods described herein may be implemented. As shown in FIG. 2, environment 200 may include a user device 210, a support platform 220, and a network 230. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some embodiments, user device 210 may receive information from and/or transmit information to support platform 220.

Support platform 220 includes one or more devices that utilize machine learning with self-support actions to determine support queue positions for support calls. In some embodiments, support platform 220 may be designed to be modular such that certain software components may be swapped in or out depending on a particular need. As such, support platform 220 may be easily and/or quickly reconfigured for different uses. In some embodiments, support platform 220 may receive information from and/or transmit information to one or more user devices 210.

In some embodiments, as shown, support platform 220 may be hosted in a cloud computing environment 222. Notably, while embodiments described herein describe support platform 220 as being hosted in cloud computing environment 222, in some embodiments, support platform 220 may be non-cloud-based (i.e., may be implemented outside of a cloud computing environment) or may be partially cloud-based.

Cloud computing environment 222 includes an environment that hosts support platform 220. Cloud computing environment 222 may provide computation, software, data access, storage, etc. services that do not require end-user knowledge of a physical location and configuration of system(s) and/or device(s) that host support platform 220. As shown, cloud computing environment 222 may include a group of computing resources 224 (referred to collectively as "computing resources 224" and individually as "computing resource 224").

Computing resource 224 includes one or more personal computers, workstation computers, server devices, and/or other types of computation and/or communication devices. In some embodiments, computing resource 224 may host support platform 220. The cloud resources may include compute instances executing in computing resource 224, storage devices provided in computing resource 224, data transfer devices provided by computing resource 224, etc. In some embodiments, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with support platform 220 and/or any other software capable of being provided via cloud computing environment 222. In some embodiments, one application 224-1 may send/receive information to/from one or more other applications 224-1, via virtual machine 224-2.

Virtual machine 224-2 includes a software embodiment of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some embodiments, virtual machine 224-2 may execute on behalf of a user (e.g., a user of user device 210 or an operator of support platform 220) and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some embodiments, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
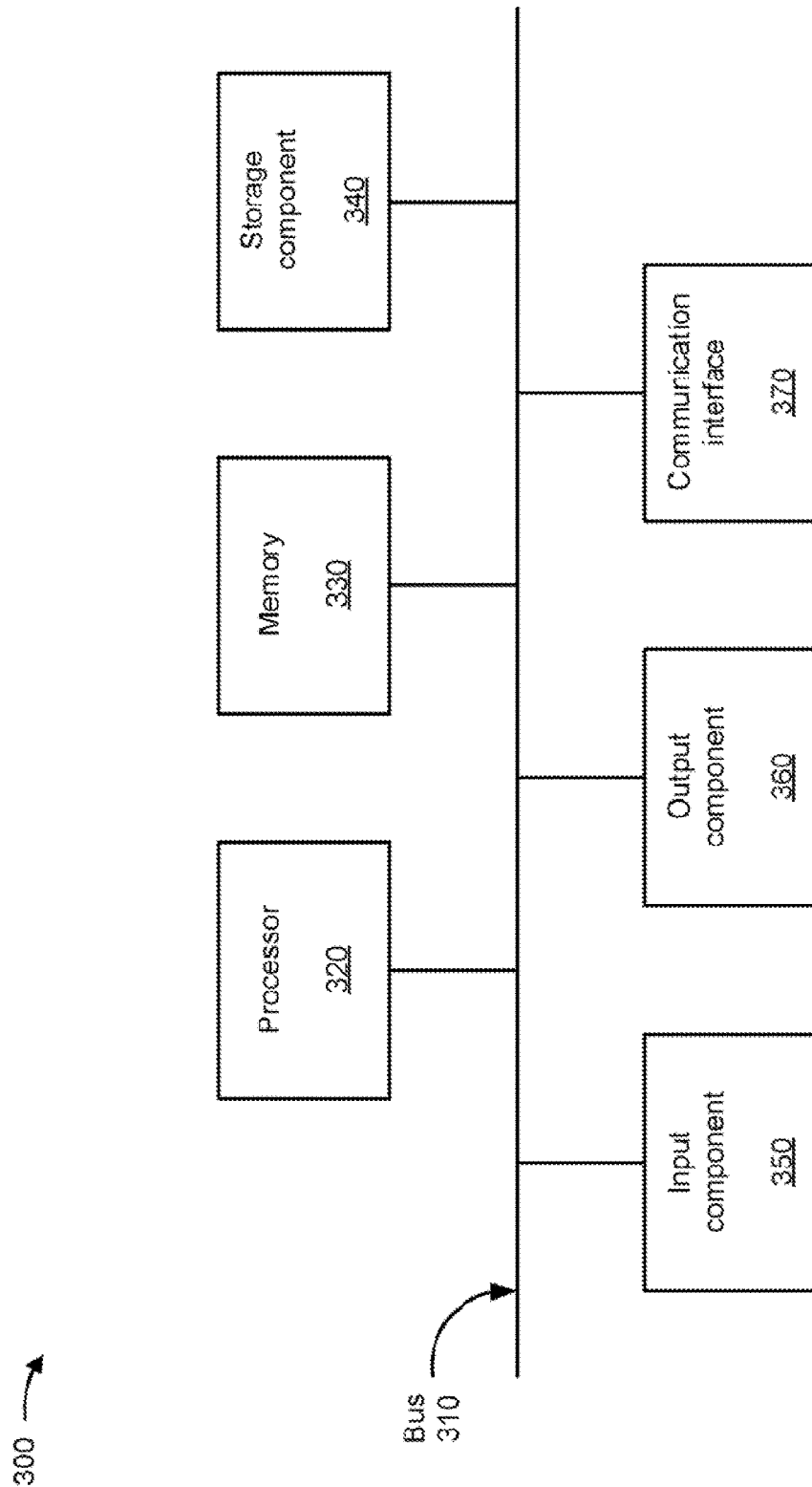
FIG. 3 is a diagram of example components of one or more devices of FIG. 2, in accordance with one or more embodiments.

FIG. 3 is a diagram of example components of a device 300. Device 300 may correspond to user device 210, support platform 220, and/or computing resource 224. In some embodiments, user device 210, support platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some embodiments, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
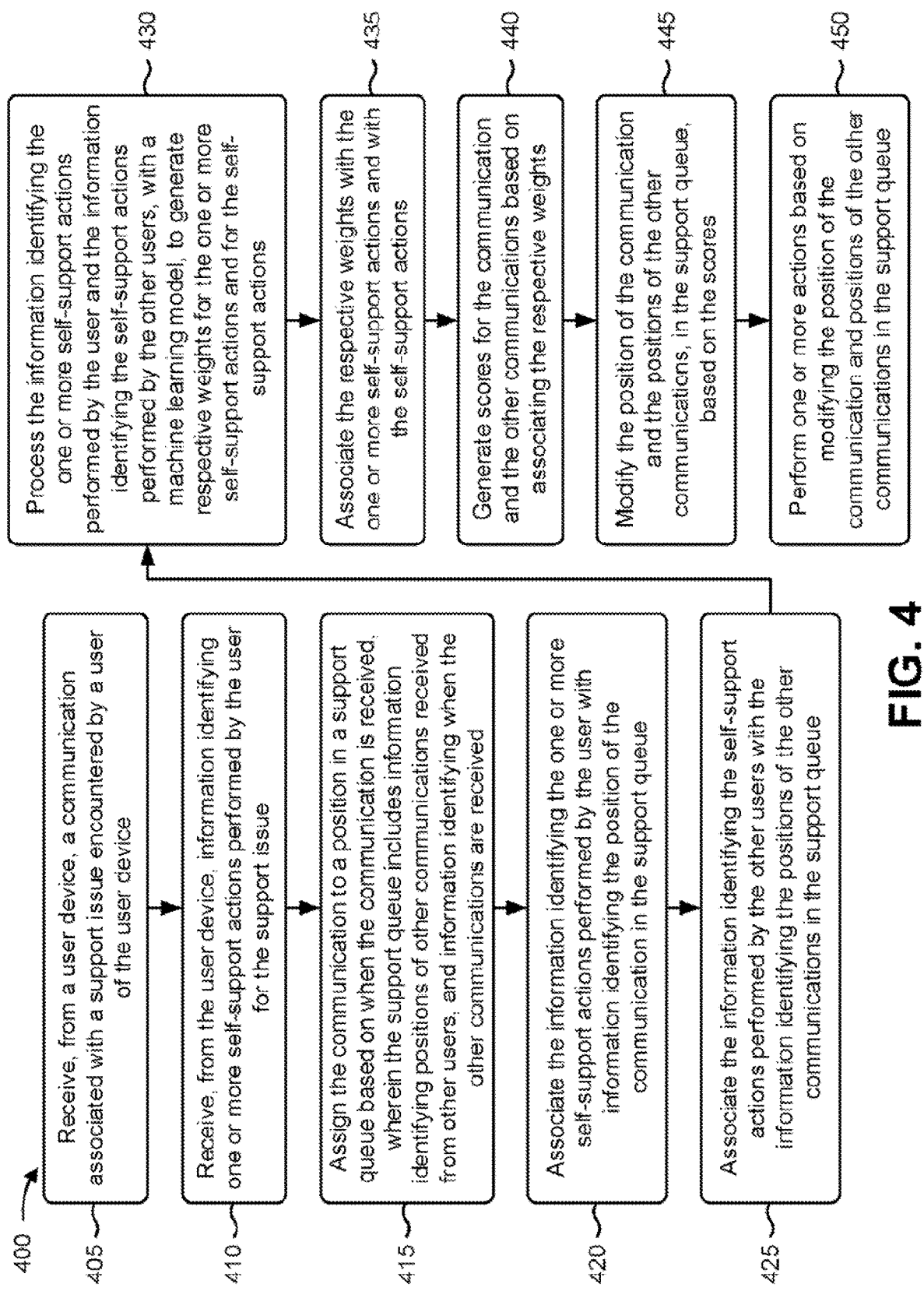
FIGS. 4-6 are flow charts of example processes for utilizing machine learning with self-support actions to determine support queue positions for support calls, in accordance with one or more embodiments.

FIG. 4 is a flow chart of an example process 400 for utilizing machine learning with self-support actions to determine support queue positions for support calls. In some embodiments, one or more process blocks of FIG. 4 may be performed by a support platform (e.g., support platform 220). In some embodiments, one or more process blocks of FIG. 4 may be performed by another device or a group of devices separate from or including the support platform, such as a user device (e.g., user device 210).

As shown in FIG. 4, process 400 may include receiving, from a user device, a communication associated with a support issue encountered by a user of the user device (block 405). For example, the support platform (e.g., using computing resource 224, processor 320, communication interface 370, and/or the like) may receive, from a user device, a communication associated with a support issue encountered by a user of the user device, as described above in connection with FIGS. 1A-2.

As further shown in FIG. 4, process 400 may include receiving, from the user device, information identifying one or more self-support actions performed by the user for the support issue (block 410). For example, the support platform (e.g., using computing resource 224, processor 320, memory 330, communication interface 370, and/or the like) may receive, from the user device, information identifying one or more self-support actions performed by the user for the support issue, as described above in connection with FIGS. 1A-2.

As further shown in FIG. 4, process 400 may include assigning the communication to a position in a support queue based on when the communication is received, wherein the support queue includes information identifying positions of other communications received from other users, and information identifying when the other communications are received (block 415). For example, the support platform (e.g., using computing resource 224, processor 320, storage component 340, and/or the like) may assign the communication to a position in a support queue based on when the communication is received, as described above in connection with FIGS. 1A-2. In some embodiments, the support queue may include information identifying positions of other communications received from other users, and information identifying when the other communications are received.

As further shown in FIG. 4, process 400 may include associating the information identifying the one or more self-support actions performed by the user with information identifying the position of the communication in the support queue (block 420). For example, the support platform (e.g., using computing resource 224, processor 320, memory 330, and/or the like) may associate the information identifying the one or more self-support actions performed by the user with information identifying the position of the communication in the support queue, as described above in connection with FIGS. 1A-2.

As further shown in FIG. 4, process 400 may include associating the information identifying the self-support actions performed by the other users with the information identifying the positions of the other communications in the support queue (block 425). For example, the support platform (e.g., using computing resource 224, processor 320, storage component 340, and/or the like) may associate the information identifying the self-support actions performed by the other users with the information identifying the positions of the other communications in the support queue, as described above in connection with FIGS. 1A-2.

As further shown in FIG. 4, process 400 may include processing the information identifying the one or more self-support actions performed by the user and the information identifying the self-support actions performed by the other users, with a machine learning model, to generate respective weights for the one or more self-support actions performed by the user and for the self-support actions performed by the other users (block 430). For example, the support platform (e.g., using computing resource 224, processor 320, memory 330, and/or the like) may process the information identifying the one or more self-support actions performed by the user and the information identifying the self-support actions performed by the other users, with a machine learning model, to generate respective weights for the one or more self-support actions performed by the user and for the self-support actions performed by the other users, as described above in connection with FIGS. 1A-2.

As further shown in FIG. 4, process 400 may include associating the respective weights with the one or more self-support actions performed by the user and with the self-support actions performed by the other users (block 435). For example, the support platform (e.g., using computing resource 224, processor 320, storage component 340, and/or the like) may associate the respective weights with the one or more self-support actions performed by the user and with the self-support actions performed by the other users, as described above in connection with FIGS. 1A-2.

As further shown in FIG. 4, process 400 may include generating scores for the communication and the other communications based on associating the respective weights with the one or more self-support actions performed by the user and with the self-support actions performed by the other users (block 440). For example, the support platform (e.g., using computing resource 224, processor 320, memory 330, and/or the like) may generate scores for the communication and the other communications based on associating the respective weights with the one or more self-support actions performed by the user and with the self-support actions performed by the other users, as described above in connection with FIGS. 1A-2.

As further shown in FIG. 4, process 400 may include modifying the position of the communication and the positions of the other communications, in the support queue, based on the scores (block 445). For example, the support platform (e.g., using computing resource 224, processor 320, storage component 340, and/or the like) may modify the position of the communication and the positions of the other communications, in the support queue, based on the scores, as described above in connection with FIGS. 1A-2.

As further shown in FIG. 4, process 400 may include performing one or more actions based on modifying the position of the communication and the positions of the other communications in the support queue (block 450). For example, the support platform (e.g., using computing resource 224, processor 320, memory 330, communication interface 370, and/or the like) may perform one or more actions based on modifying the position of the communication and the positions of the other communications in the support queue, as described above in connection with FIGS. 1A-2.

Process 400 may include additional embodiments, such as any single embodiment or any combination of embodiments described below and/or described with regard to any other process described herein.

In some embodiments, when performing the one or more actions, the support platform may provide information indicating that the position of the communication in the support queue improved due to the one or more self-support actions performed by the user, may process the communication of the user based on modifying the position of the communication, may provide, to the user device, suggested self-support actions to improve the position of the communication in the support queue, and/or may disconnect the communication with the user device when the one or more self-support actions performed by the user solve the support issue.

In some embodiments, the support platform may provide, to the user device, information identifying movement in the support queue for the position of the communication of the user and may provide, to the user device, information indicating points awarded to the user for the one or more self-support actions performed by the user.

In some embodiments, the support platform may receive the communication associated with the support issue prior to receiving the information identifying the one or more self-support actions performed by the user, and the support platform may associate the communication and the information identifying the one or more self-support actions performed by the user based on a device identifier associated with the communication.

In some embodiments, the support platform may receive the communication associated with the support issue after receiving the information identifying the one or more self-support actions performed by the user and may associate the communication and the information identifying the one or more self-support actions performed by the user based on an account associated with the user.

In some embodiments, the support platform may receive the communication associated with the support issue after receiving the information identifying the one or more self-support actions performed by the user, may provide, to the user device, an identifier for identifying the one or more self-support actions performed by the user, may receive the identifier via the communication and may associate the communication and the information identifying the one or more self-support actions performed by the user based on the identifier.

In some embodiments, the support platform may provide, to the user device, suggested self-support actions based on receiving the communication, where the one or more self-support actions performed by the user include one or more of the suggested self-support actions.

Although FIG. 4 shows example blocks of process 400, in some embodiments, process 400 may include additional blocks, fewer blocks, different blocks, or differently arranged blocks than those depicted in FIG. 4. Additionally, or alternatively, two or more of the blocks of process 400 may be performed in parallel.

Figure 5:
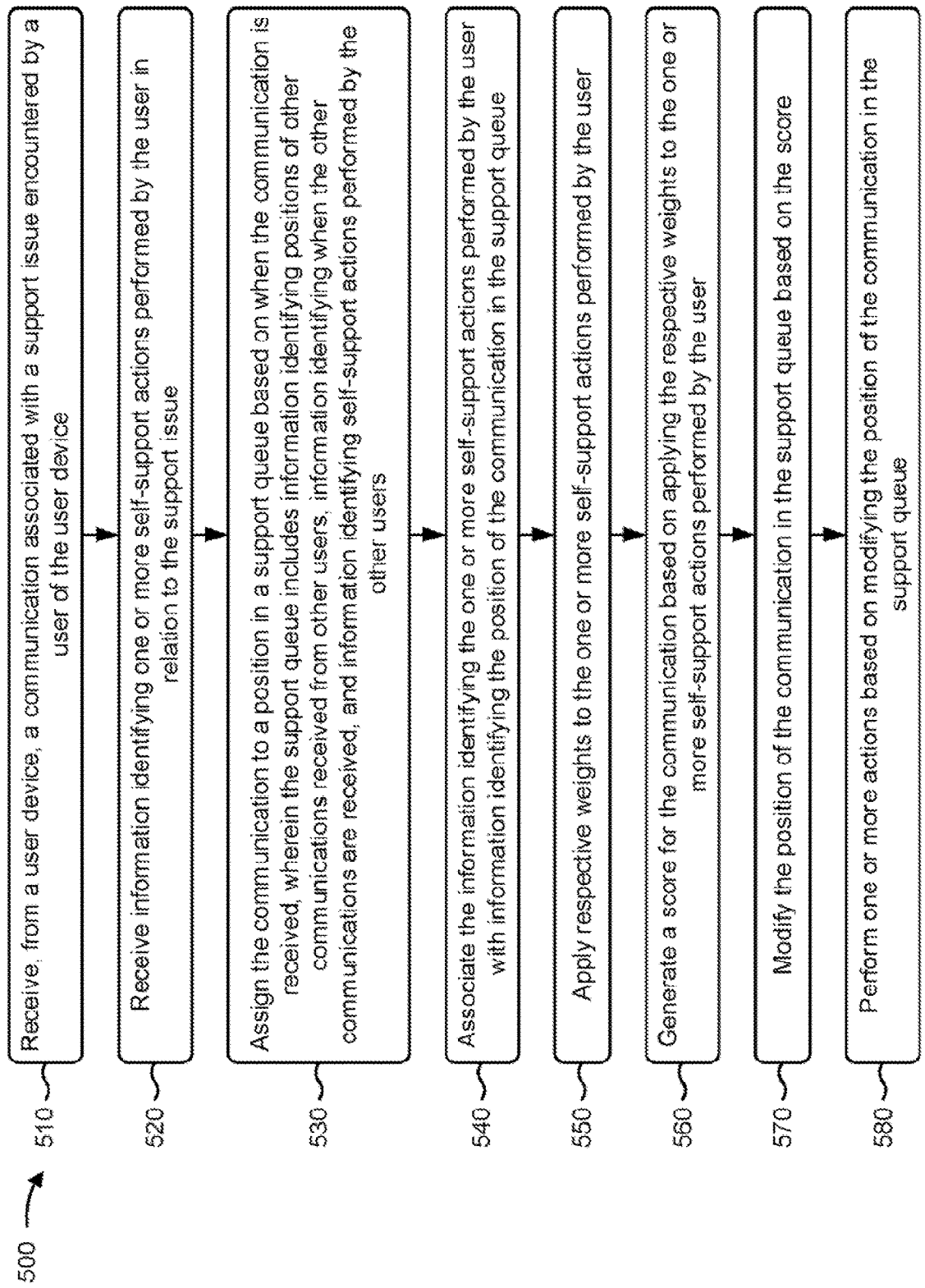

FIG. 5 is a flow chart of an example process 500 for utilizing machine learning with self-support actions to determine support queue positions for support calls. In some embodiments, one or more process blocks of FIG. 5 may be performed by a support platform (e.g., support platform 220). In some embodiments, one or more process blocks of FIG. 5 may be performed by another device or a group of devices separate from or including the support platform, such as a user device (e.g., user device 210).

As shown in FIG. 5, process 500 may include receiving, from a user device, a communication associated with a support issue encountered by a user of the user device (block 510). For example, the support platform (e.g., using computing resource 224, processor 320, communication interface 370, and/or the like) may receive, from a user device, a communication associated with a support issue encountered by a user of the user device, as described above in connection with FIGS. 1A-2.

As further shown in FIG. 5, process 500 may include receiving information identifying one or more self-support actions performed by the user in relation to the support issue (block 520). For example, the support platform (e.g., using computing resource 224, processor 320, communication interface 370, and/or the like) may receive information identifying one or more self-support actions performed by the user in relation to the support issue, as described above in connection with FIGS. 1A-2.

As further shown in FIG. 5, process 500 may include assigning the communication to a position in a support queue based on when the communication is received, wherein the support queue includes information identifying positions of other communications received from other users, information identifying when the other communications are received, and information identifying self-support actions performed by the other users (block 530). For example, the support platform (e.g., using computing resource 224, processor 320, memory 330, and/or the like) may assign the communication to a position in a support queue based on when the communication is received, as described above in connection with FIGS. 1A-2. In some embodiments, the support queue may include information identifying positions of other communications received from other users, information identifying when the other communications are received, and/or information identifying self-support actions performed by the other users.

As further shown in FIG. 5, process 500 may include associating the information identifying the one or more self-support actions performed by the user with information identifying the position of the communication in the support queue (block 540). For example, the support platform (e.g., using computing resource 224, processor 320, storage component 340, and/or the like) may associate the information identifying the one or more self-support actions performed by the user with information identifying the position of the communication in the support queue, as described above in connection with FIGS. 1A-2.

As further shown in FIG. 5, process 500 may include applying respective weights to the one or more self-support actions performed by the user (block 550). For example, the support platform (e.g., using computing resource 224, processor 320, memory 330, and/or the like) may apply respective weights to the one or more self-support actions performed by the user, as described above in connection with FIGS. 1A-2.

As further shown in FIG. 5, process 500 may include generating a score for the communication based on applying the respective weights to the one or more self-support actions performed by the user (block 560). For example, the support platform (e.g., using computing resource 224, processor 320, storage component 340, and/or the like) may generate a score for the communication based on applying the respective weights to the one or more self-support actions performed by the user, as described above in connection with FIGS. 1A-2.

As further shown in FIG. 5, process 500 may include modifying the position of the communication in the support queue based on the score (block 570). For example, the support platform (e.g., using computing resource 224, processor 320, memory 330, and/or the like) may modify the position of the communication in the support queue based on the score, as described above in connection with FIGS. 1A-2.

As further shown in FIG. 5, process 500 may include performing one or more actions based on modifying the position of the communication in the support queue (block 580). For example, the support platform (e.g., using computing resource 224, processor 320, memory 330, communication interface 370, and/or the like) may perform one or more actions based on modifying the position of the communication in the support queue, as described above in connection with FIGS. 1A-2.

Process 500 may include additional embodiments, such as any single embodiment or any combination of embodiments described below and/or described with regard to any other process described herein.

In some embodiments, when performing the one or more actions, the support platform may provide information indicating that the position of the communication in the support queue improved due to the one or more self-support actions performed by the user, may process the communication of the user based on modifying the position of the communication, may provide, to the user device, suggested self-support actions to improve the position of the communication in the support queue, and/or may disconnect the communication with the user device when the one or more self-support actions performed by the user solve the support issue.

In some embodiments, the support platform may provide, to the user device, information identifying movement in the support queue for the position of the communication of the user and may provide, to the user device, information indicating points awarded to the user for the one or more self-support actions performed by the user.

In some embodiments, the support platform may receive the communication associated with the support issue prior to receiving the information identifying the one or more self-support actions performed by the user and may correlate the communication and the information identifying the one or more self-support actions performed by the user based on a device identifier associated with the communication.

In some embodiments, the support platform may receive the communication associated with the support issue after receiving the information identifying the one or more self-support actions performed by the user and may correlate the communication and the information identifying the one or more self-support actions performed by the user based on an account associated with the user.

In some embodiments, the support platform may receive the communication associated with the support issue after receiving the information identifying the one or more self-support actions performed by the user, may provide, to the user device, an identifier for identifying the one or more self-support actions performed by the user, may receive the identifier via the communication and may correlate the communication and the information identifying the one or more self-support actions performed by the user based on receiving the identifier via the communication.

In some embodiments, when performing the one or more actions, the support platform may cause a problem device to reboot, may cause the problem device to execute a self-diagnostic action, may attempt to communicate with the problem device, may attempt to repair the problem device, may cause an autonomous vehicle to travel to a location of the user, or may cause an unmanned aerial vehicle to travel to the location of the user.

Although FIG. 5 shows example blocks of process 500, in some embodiments, process 500 may include additional blocks, fewer blocks, different blocks, or differently arranged blocks than those depicted in FIG. 5. Additionally, or alternatively, two or more of the blocks of process 500 may be performed in parallel.

Figure 6:
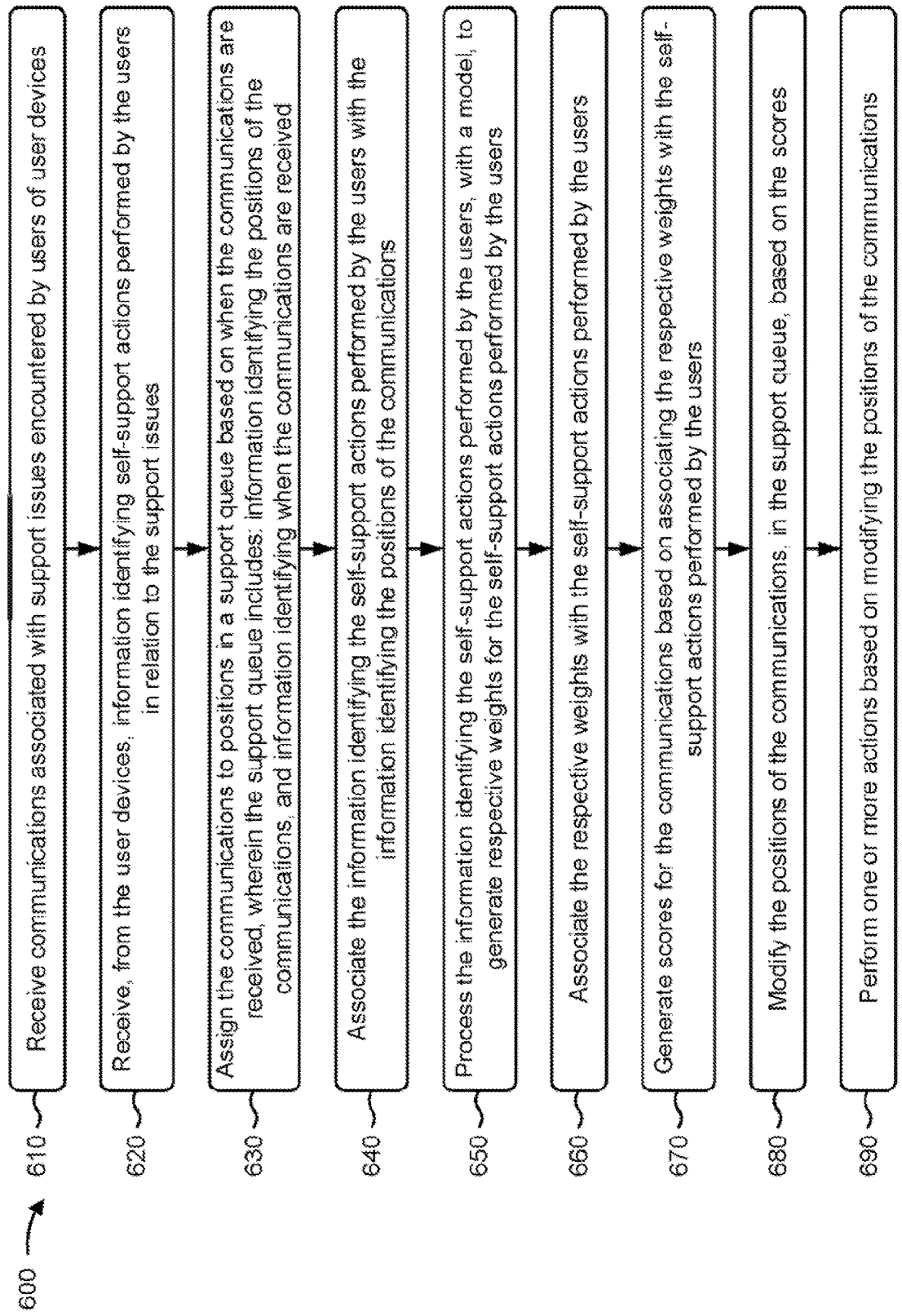

FIG. 6 is a flow chart of an example process 600 for utilizing machine learning with self-support actions to determine support queue positions for support calls. In some embodiments, one or more process blocks of FIG. 6 may be performed by a support platform (e.g., support platform 220). In some embodiments, one or more process blocks of FIG. 6 may be performed by another device or a group of devices separate from or including the support platform, such as a user device (e.g., user device 210).

As shown in FIG. 6, process 600 may include receiving communications associated with support issues encountered by users of user devices (block 610). For example, the support platform (e.g., using computing resource 224, processor 320, communication interface 370, and/or the like) may receive communications associated with support issues encountered by users of user devices, as described above in connection with FIGS. 1A-2.

As further shown in FIG. 6, process 600 may include receiving, from the user devices, information identifying self-support actions performed by the users in relation to the support issues (block 620). For example, the support platform (e.g., using computing resource 224, processor 320, storage component 340, communication interface 370, and/or the like) may receive, from the user devices, information identifying self-support actions performed by the users in relation to the support issues, as described above in connection with FIGS. 1A-2.

As further shown in FIG. 6, process 600 may include assigning the communications to positions in a support queue based on when the communications are received, wherein the support queue includes information identifying the positions of the communications, and information identifying when the communications are received (block 630). For example, the support platform (e.g., using computing resource 224, processor 320, memory 330, and/or the like) may assign the communications to positions in a support queue based on when the communications are received, as described above in connection with FIGS. 1A-2. In some embodiments, the support queue may include information identifying the positions of the communications, and information identifying when the communications are received.

As further shown in FIG. 6, process 600 may include associating the information identifying the self-support actions performed by the users with the information identifying the positions of the communications (block 640). For example, the support platform (e.g., using computing resource 224, processor 320, storage component 340, and/or the like) may associate the information identifying the self-support actions performed by the users with the information identifying the positions of the communications, as described above in connection with FIGS. 1A-2.

As further shown in FIG. 6, process 600 may include processing the information identifying the self-support actions performed by the users, with a model, to generate respective weights for the self-support actions performed by the users (block 650). For example, the support platform (e.g., using computing resource 224, processor 320, memory 330, and/or the like) may process the information identifying the self-support actions performed by the users, with a model, to generate respective weights for the self-support actions performed by the users, as described above in connection with FIGS. 1A-2.

As further shown in FIG. 6, process 600 may include associating the respective weights with the self-support actions performed by the users (block 660). For example, the support platform (e.g., using computing resource 224, processor 320, storage component 340, and/or the like) may associate the respective weights with the self-support actions performed by the users, as described above in connection with FIGS. 1A-2.

As further shown in FIG. 6, process 600 may include generating scores for the communications based on associating the respective weights with the self-support actions performed by the users (block 670). For example, the support platform (e.g., using computing resource 224, processor 320, memory 330, and/or the like) may generate scores for the communications based on associating the respective weights with the self-support actions performed by the users, as described above in connection with FIGS. 1A-2.

As further shown in FIG. 6, process 600 may include modifying the positions of the communications, in the support queue, based on the scores (block 680). For example, the support platform (e.g., using computing resource 224, processor 320, storage component 340, and/or the like) may modify the positions of the communications, in the support queue, based on the scores, as described above in connection with FIGS. 1A-2.

As further shown in FIG. 6, process 600 may include performing one or more actions based on modifying the positions of the communications in the support queue (block 690). For example, the support platform (e.g., using computing resource 224, processor 320, memory 330, communication interface 370, and/or the like) may perform one or more actions based on modifying the positions of the communications in the support queue, as described above in connection with FIGS. 1A-2.

Process 600 may include additional embodiments, such as any single embodiment or any combination of embodiments described below and/or described with regard to any other process described herein.

In some embodiments, when performing the one or more actions, the support platform may provide information indicating that one of the positions of one of the communications in the support queue improved due to one or more self-support actions performed by one of the users, may process one of the communications of one of the users based on modifying one of the positions of the one of the communications, may provide, to one of the user devices, suggested self-support actions to improve one of the positions of one of the communications in the support queue, and/or may disconnect one of the communications with one of the user devices when one of the self-support actions performed by one of the users solves one of the support issues.

In some embodiments, the support platform may provide, to one of the user devices, information identifying movement in the support queue for one of the positions of one of the communications of one of the users and may provide, to one of the user devices, information indicating points awarded to one of the users for one or more of the self-support actions performed by the one of the users.

In some embodiments, the support platform may associate the communications and the information identifying the self-support actions performed by the users based on device identifiers associated with the communications. In some embodiments, the support platform may associate the communications and the information identifying the self-support actions performed by the users based on accounts associated with the users.

In some embodiments, the support platform may provide, to the user devices, identifiers for identifying the self-support actions performed by the users, may receive the identifiers via the communications and may associate the communications and the information identifying the self-support actions performed by the users based on receiving the identifiers via the communications.

Although FIG. 6 shows example blocks of process 600, in some embodiments, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the embodiments to the precise form disclosed. Modifications and variations may be made in light of the above disclosure or may be acquired from practice of the embodiments.

As used herein, the term "component" is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some embodiments, a user may interact with the information, such as by providing input via an input component of a device that provides the user interface for display. In some embodiments, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the embodiments. Thus, the operation and behavior of the systems and/or methods were described herein without reference to specific software code—it being understood that software and hardware may be designed to implement the systems and/or methods based on the description herein.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

What is claimed is:

1. A system comprising:
one or more processors and non-transitory media storing instructions that, when executed, cause the one or more processors to perform operations comprising:
in response to monitoring a queue in connection with a supported product or service, detecting a data item associated with the supported product or service in the queue, the data item comprising a code related to an access to the supported product or service;
in response to the detection of the data item in the queue:
(i) obtaining, based on the code of the detected data item, a communication comprising an object identifier related to the supported product or service and other configuration information for the access to the supported product or service; and
(ii) generating an event listener configured to listen for one or more changes related to the supported product or service;
in response to the event listener detecting a change related the supported product or service, sending an indication of a plurality of self-support actions to a user device;
determining one or more actions of the plurality of self-support actions; and
causing, based on the determined one or more actions, an adjustment related to the access to the supported product or service.

2. The system of claim 1, the operations further comprising:
determining an expiration time for the event listener based on a type of the supported product or service; and
configuring the event listener to expire in accordance with the expiration time.

3. The system of claim 1, the operations further comprising:
in response to the detection of the data item in the queue, generating, based on the code and a transaction time related to the access to the supported product or service, a transaction-time-limited request for communications occurring within a predetermined time of the transaction time, the data item comprising the transaction time, wherein obtaining the communication comprises obtaining, based on the transaction-time-limited request, the communication via an account associated with a user of the user device.

4. A method comprising:
detecting a data item associated with a product or service, the data item comprising a code related to an access to the product or service;

obtaining, based on the code of the detected data item, a communication comprising configuration information related to the product or service;

detecting a change related to the product or service;

sending, based on the detected change related to the product or service, an indication of a set of self-support actions to a user device;

determining one or more actions of the set of self-support actions; and causing, based on the determined one or more actions, an adjustment related to the access to the product or service.

5. The method of claim 4, further comprising:

generating, based on the configuration information of the communication, an event listener configured to listen for one or more changes related to the product or service.

6. The method of claim 5, further comprising:

determining an expiration time for the event listener based on a type of the product or service; and configuring the event listener to expire in accordance with the expiration time.

7. The method of claim 4, further comprising:

generating, based on a transaction time related to the access to the product or service, a transaction-time-limited request for communications occurring within a predetermined time of the transaction time, wherein obtaining the communication comprises obtaining, based on the transaction-time-limited request, the communication via an account associated with a user of the user device.

8. The method of claim 4, wherein detecting the data item comprise detecting the data item in a transaction queue.

9. The method of claim 4, wherein detecting the change comprises detecting a configuration availability change related to the product or service, wherein sending the indication comprises sending, based on the detected configuration availability change, the indication of the set of self-support actions to the user device.

10. The method of claim 4, wherein detecting the change comprises detecting a resource cost change related to the product or service, wherein sending the indication comprises sending, based on the detected resource cost change, the indication of the set of self-support actions to the user device.

11. The method of claim 4, wherein causing the adjustment related to the access to the product or service comprises cancelling the access to the product or service based on the determined one or more actions.

12. One or more non-transitory machine-readable media storing instructions that, when executed by one or more processors, cause operations comprising:

detecting a data item associated with a product or service;

obtaining, based on the detected data item, a communication comprising configuration information related to the product or service;

detecting a change related to access to the product or service;

sending, based on the detected change related to the access, an indication of one or more predefined actions to a user device;

determining an action of the one or more predefined actions, the determined action corresponding to a self-support option; and causing, based on the determined action, an adjustment related to the access to the product or service.

13. The media of claim 12, further comprising:

generating, based on the configuration information of the communication, an event listener configured to listen for one or more changes related to the product or service.

14. The media of claim 13, further comprising:

determining an expiration time for the event listener based on a type of the product or service; and configuring the event listener to expire in accordance with the expiration time.

15. The media of claim 12, further comprising:

generating, based on a transaction time related to the access to the product or service, a transaction-time-limited request for communications occurring within a predetermined time of the transaction time, wherein obtaining the communication comprises obtaining, based on the transaction-time-limited request, the communication via an account associated with a user of the user device.

16. The media of claim 12, wherein detecting the data item comprise detecting the data item in a transaction queue.

17. The media of claim 12, wherein detecting the change comprises detecting a configuration availability change related to the product or service, wherein sending the indication comprises sending, based on the detected configuration availability change, the indication of a set of self-support actions to the user device.

18. The media of claim 12, wherein detecting the change comprises detecting a resource cost change related to the product or service, wherein sending the indication comprises sending, based on the detected resource cost change, the indication of a set of self-support actions to the user device.

19. The media of claim 12, wherein causing the adjustment related to the access to the product or service comprises cancelling the access to the product or service based on the determined action.

20. The media of claim 12, wherein causing the adjustment related to the access to the product or service comprises modify a configuration of the access to the product or service based on the determined action.

* * * * *